United States Patent
Yoshida et al.

(10) Patent No.: US 9,638,855 B2
(45) Date of Patent: May 2, 2017

(54) ILLUMINATION APPARATUS AND IMAGE SENSOR UNIT INCLUDING DIFFUSING PATTERNS WITH DIFFERING INTERVALS

(71) Applicant: CANON COMPONENTS, INC., Saitama (JP)

(72) Inventors: Hidemasa Yoshida, Saitama (JP); Yoshihiko Tsumekawa, Saitama (JP)

(73) Assignee: CANON COMPONENTS, INC., Saitama (JP)

( * ) Notice: Subject to any disclaimer, the term of this patent is extended or adjusted under 35 U.S.C. 154(b) by 299 days.

(21) Appl. No.: 14/462,758

(22) Filed: Aug. 19, 2014

(65) Prior Publication Data

US 2015/0060651 A1    Mar. 5, 2015

(30) Foreign Application Priority Data

Sep. 3, 2013 (JP) ................................. 2013-182450

(51) Int. Cl.
*H04N 1/028* (2006.01)
*F21V 8/00* (2006.01)

(52) U.S. Cl.
CPC ....... *G02B 6/0096* (2013.01); *H04N 1/02855* (2013.01)

(58) Field of Classification Search
CPC .......................... G02B 6/0096; H04N 1/02855
See application file for complete search history.

(56) References Cited

U.S. PATENT DOCUMENTS

| | | | |
|---|---|---|---|
| 6,714,711 B1* | 3/2004 | Lieberman | G01N 21/7703 362/552 |
| 6,796,502 B2 | 9/2004 | Nogami et al. | |
| 8,564,854 B2 | 10/2013 | Kawano et al. | |
| 8,727,591 B2 | 5/2014 | Mochizuki | |
| 2005/0286854 A1* | 12/2005 | Honma | G02B 6/0048 385/146 |

FOREIGN PATENT DOCUMENTS

| | | |
|---|---|---|
| JP | 10112783 A | 4/1998 |
| JP | 2003234873 A | 8/2003 |
| JP | 2010198851 A | 9/2010 |
| JP | 2011087290 A | 4/2011 |
| JP | 2011228840 A | 11/2011 |
| JP | 2011234150 A | 11/2011 |

OTHER PUBLICATIONS

Japanese Office Action issued in Japanese counterpart application No. JP2013-182450 dated May 19, 2015. Partial English translation provided.

* cited by examiner

*Primary Examiner* — Francis M Legasse, Jr.
(74) *Attorney, Agent, or Firm* — Rossi, Kimms & McDowell LLP

(57) ABSTRACT

An illumination apparatus includes a light source and a light guide formed in a rod shape. An end surface in a longitudinal direction is an incident surface that receives light emitted from the light source. Diffusing patterns are formed on the light guide, and intervals between the diffusing patterns closer to the incident surface in a first area close to the incident surface are smaller than intervals between the diffusing patterns closer to the incident surface in a second area farther from the incident surface than the first area.

7 Claims, 24 Drawing Sheets

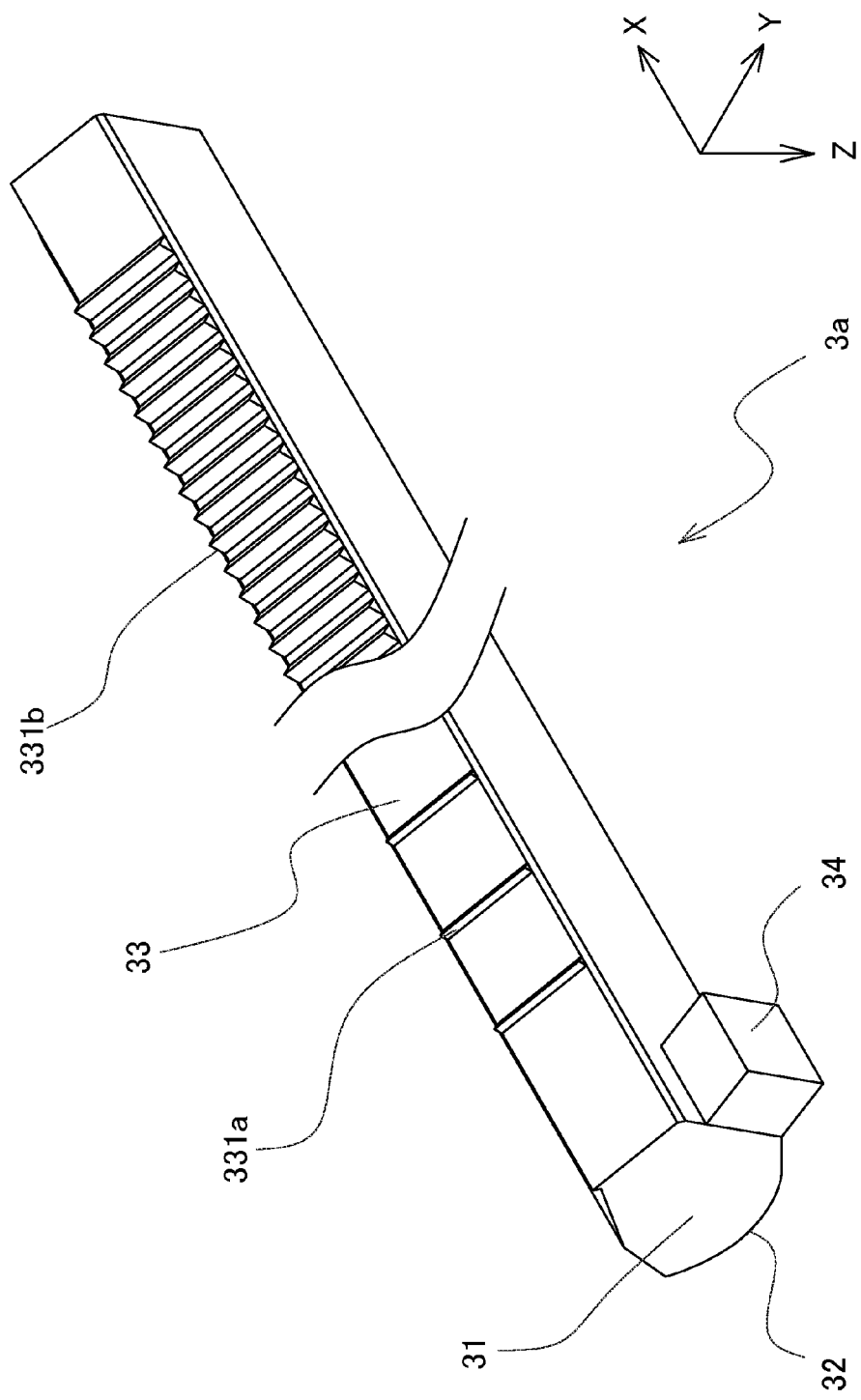

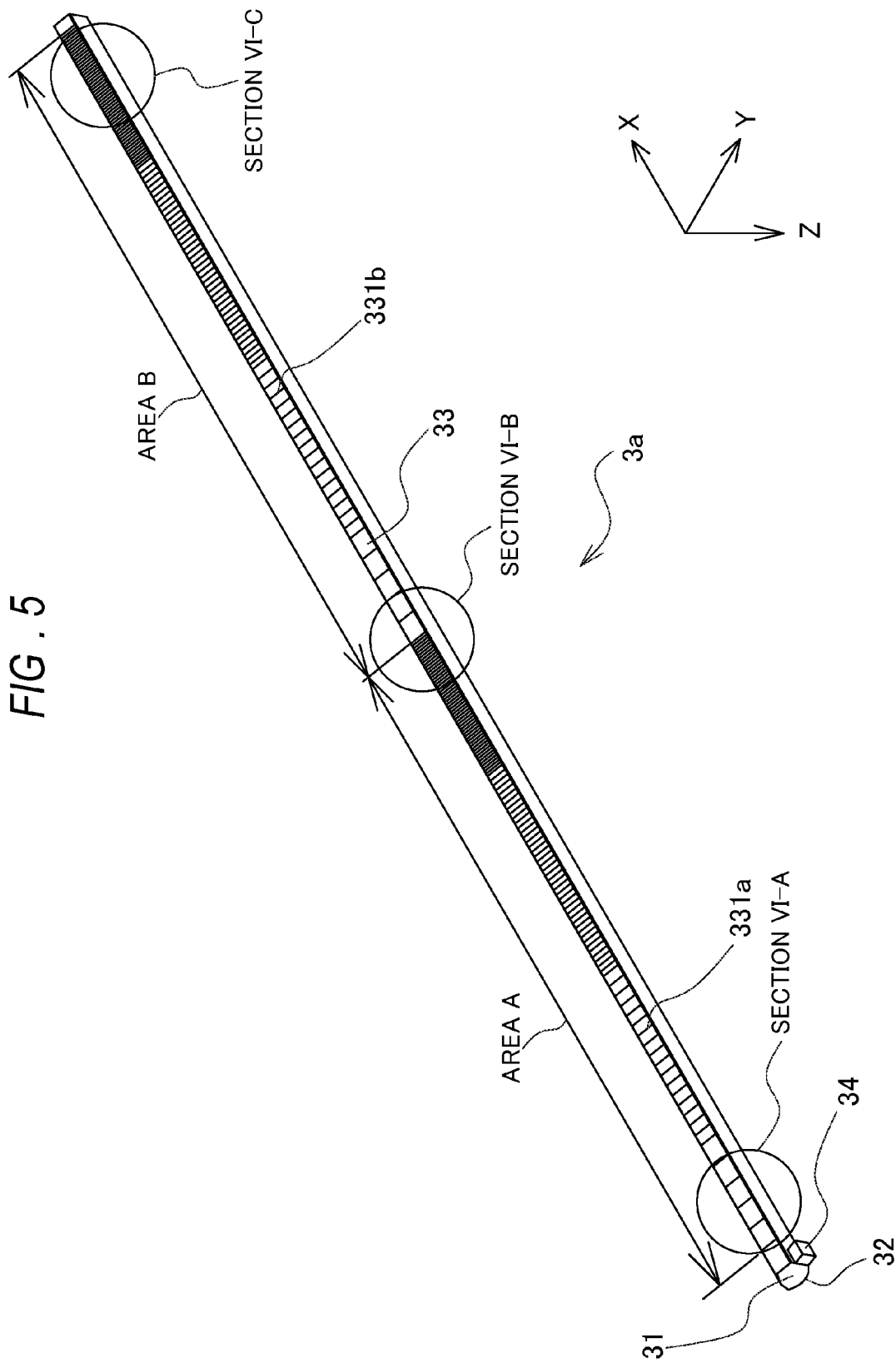

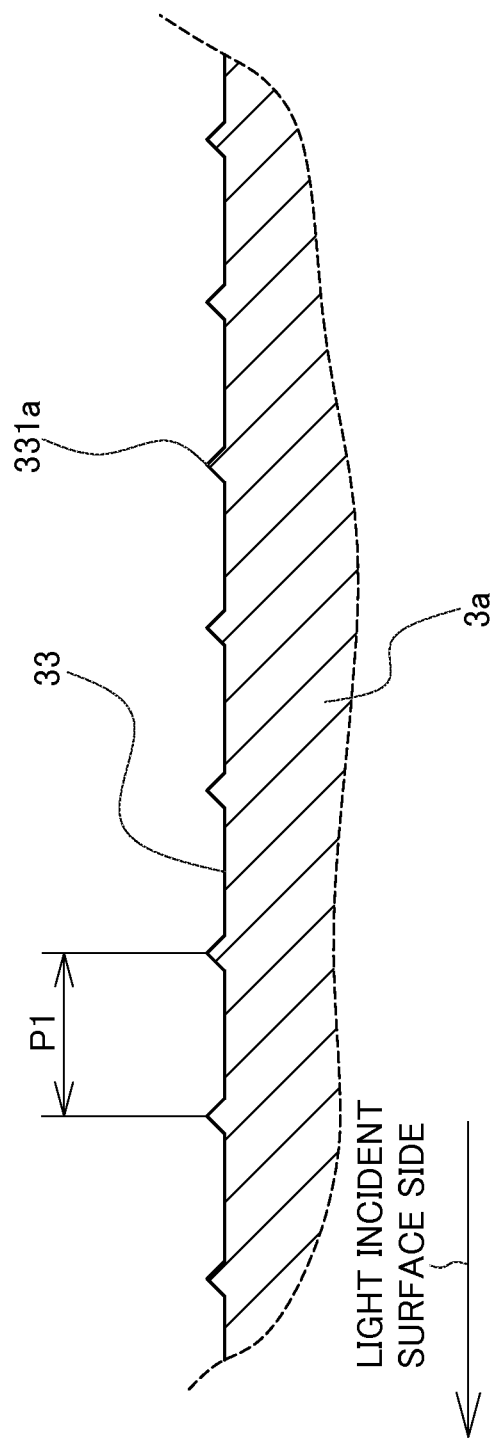

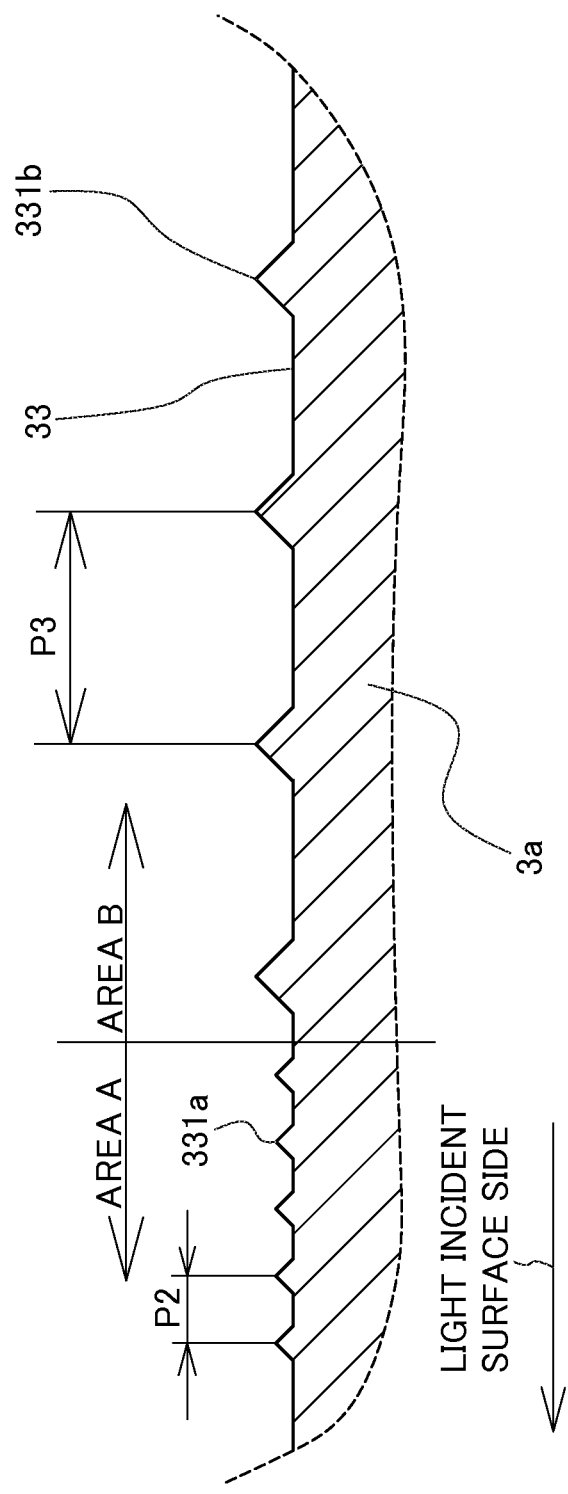

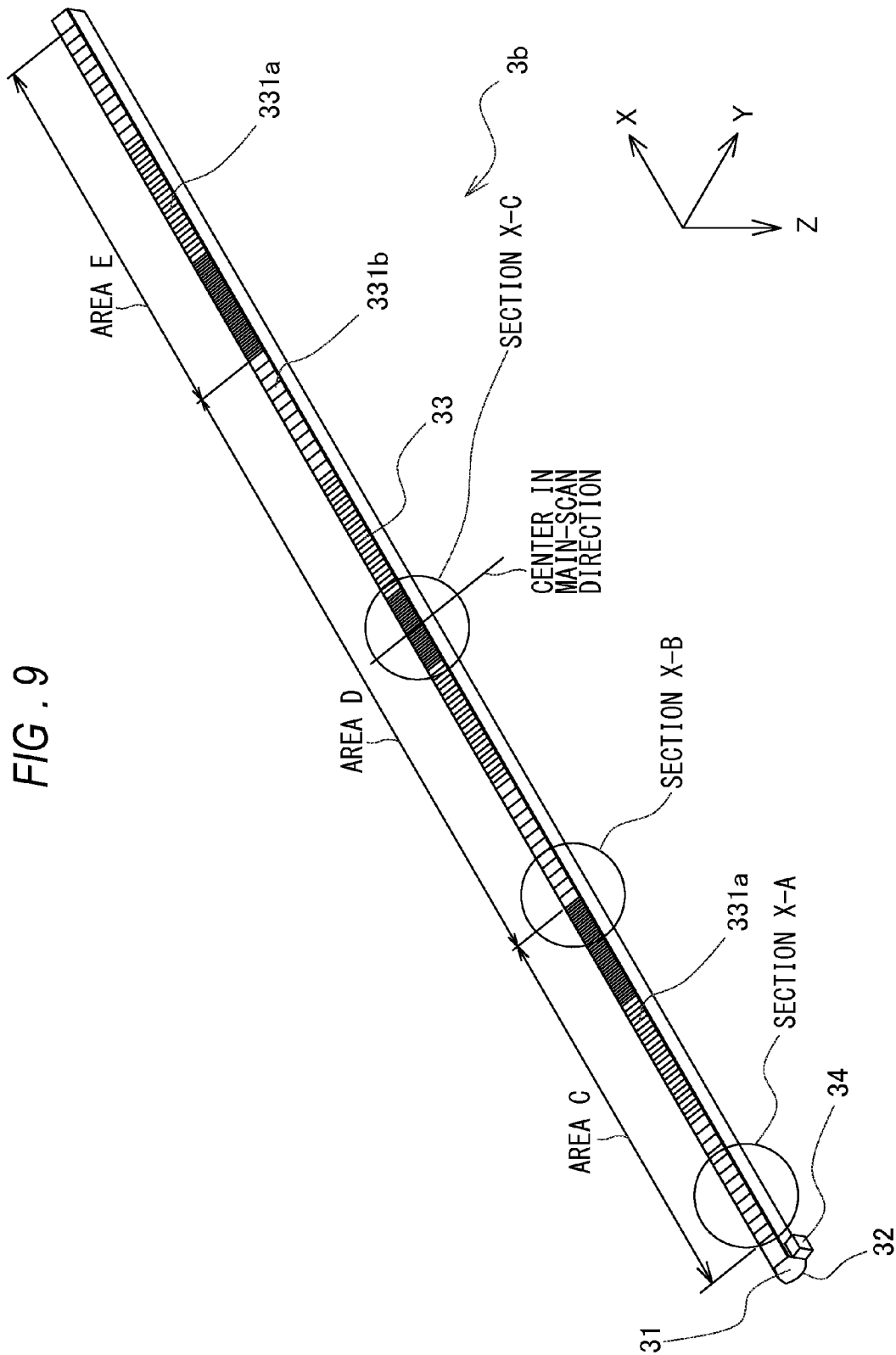

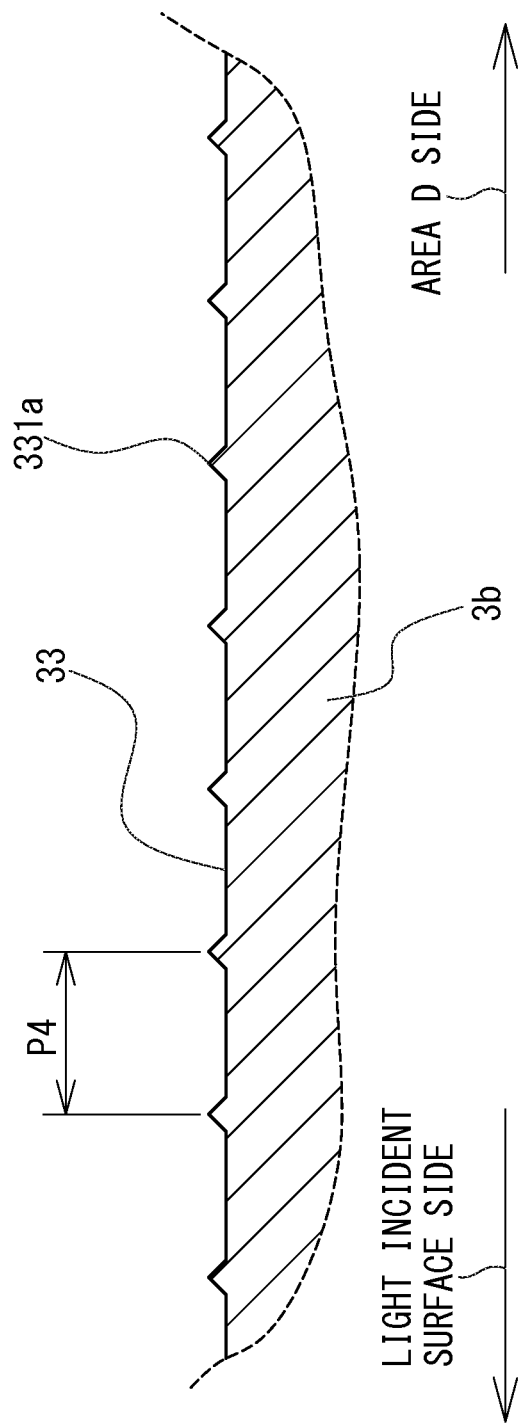

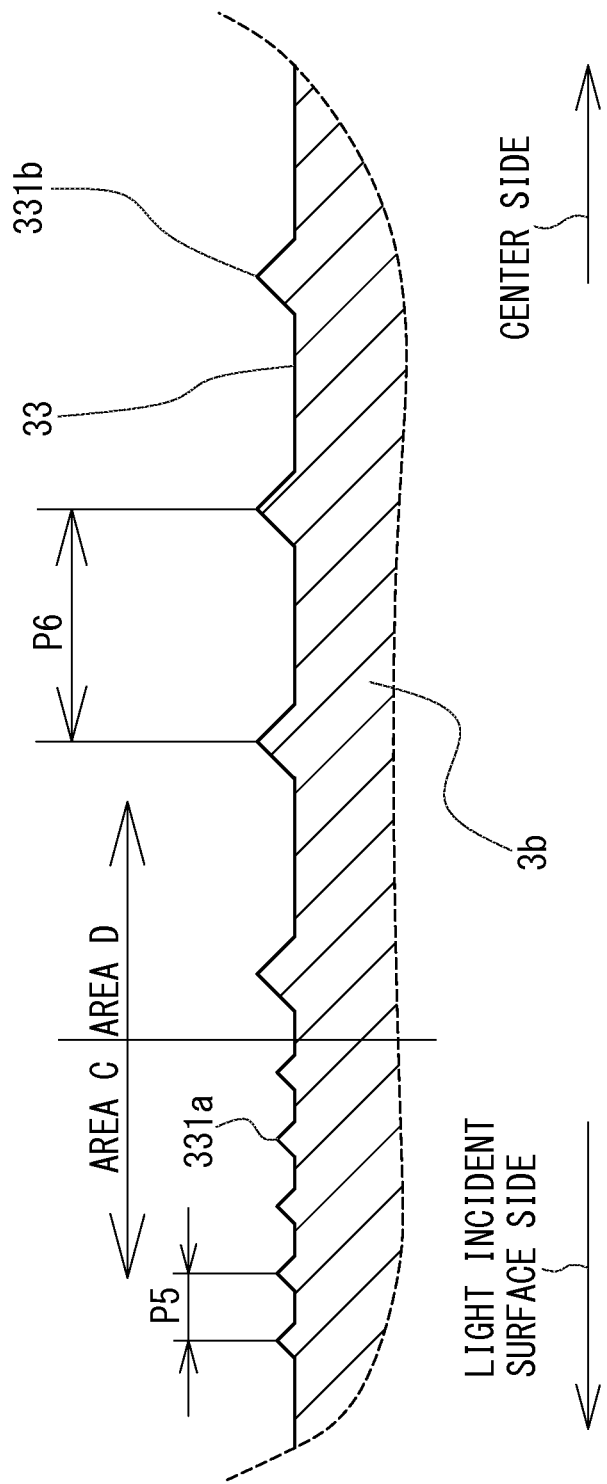

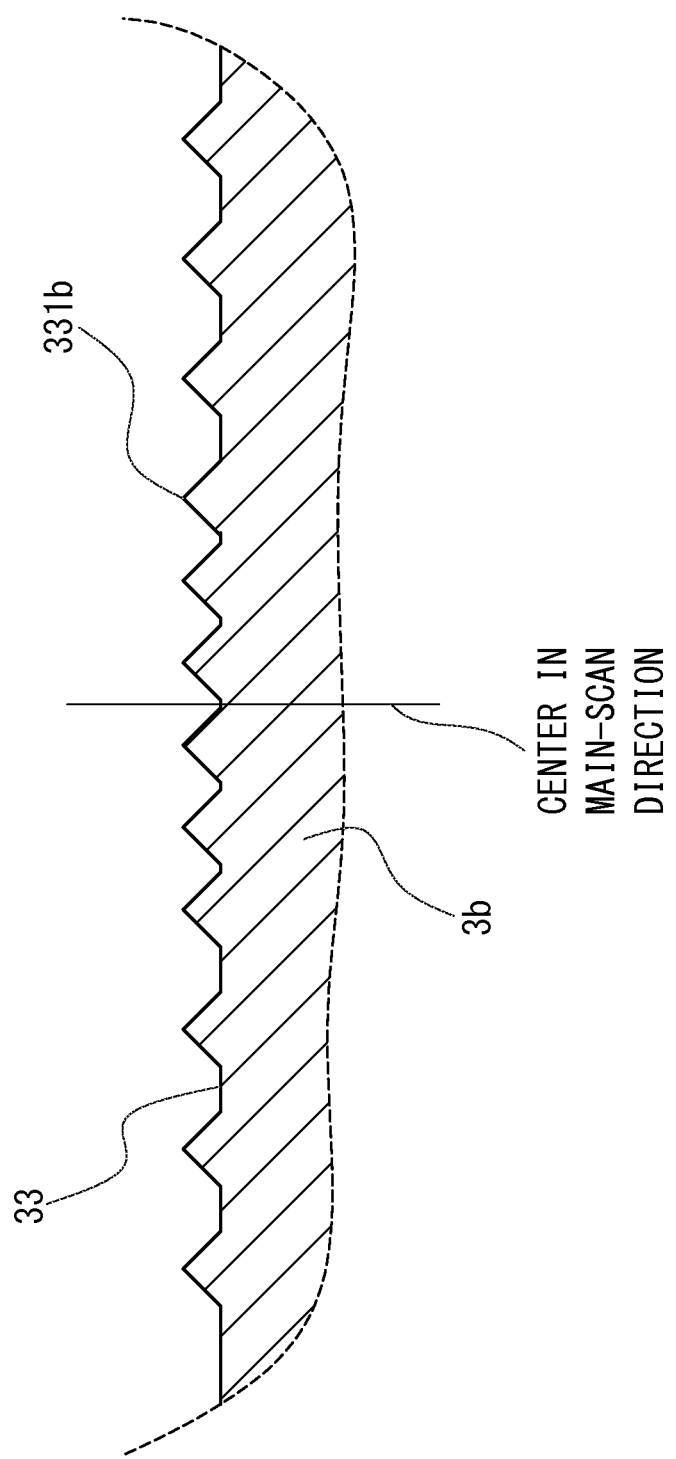

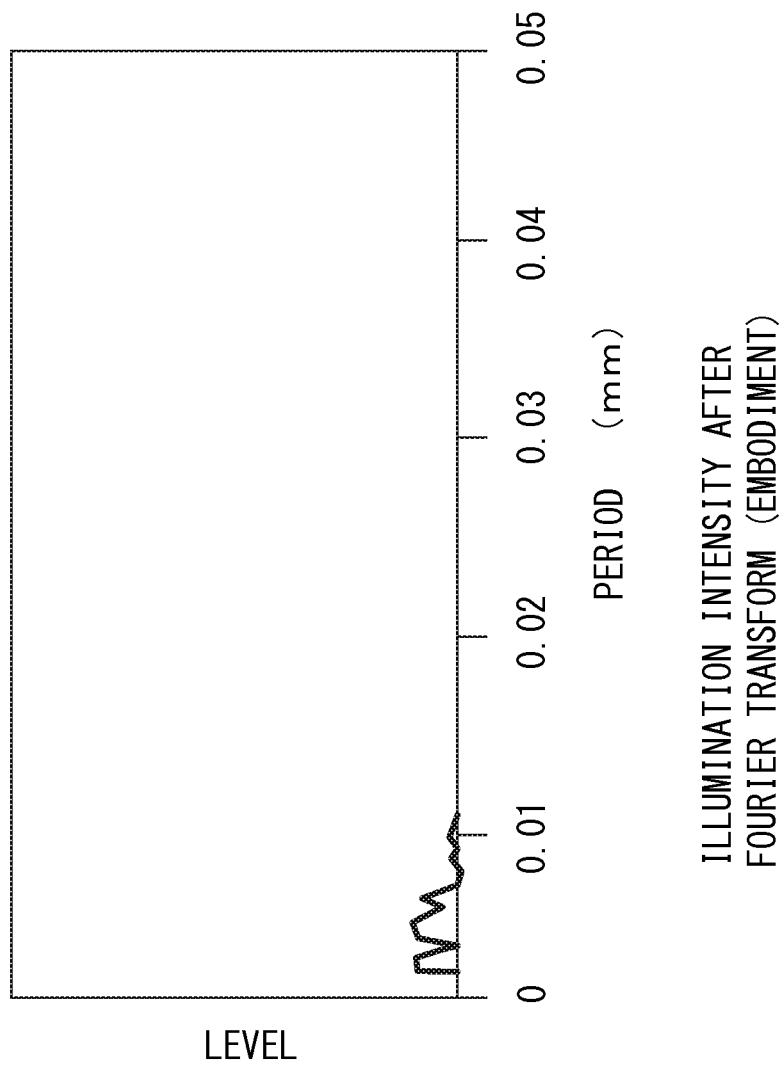

ILLUMINATION APPARATUS AND IMAGE SENSOR UNIT INCLUDING DIFFUSING PATTERNS WITH DIFFERING INTERVALS

CROSS-REFERENCE TO RELATED APPLICATION

This application is based upon and claims the benefit of priority of the prior Japanese Patent Application No. 2013-182450, filed on Sep. 3, 2013, the entire contents of which are incorporated herein by reference.

BACKGROUND OF THE INVENTION

Field of the Invention

The present invention relates to an illumination apparatus, an image sensor unit, an image reading apparatus, and an image forming apparatus.

Description of the Related Art

In an illumination apparatus used in an image sensor unit, a rod-like light guide may shape a point light source into a line. In the light guide, a light incident surface that receives light from the light source is formed on an end surface in a longitudinal direction. A light emission surface that emits light toward an illuminated object is formed in a long and thin band shape on a side surface.

However, according to the configuration, intensity of light emitted from the light emission surface (hereinafter, "illumination intensity") decreases with an increase in the distance from an end closer to the light incident surface. Therefore, patterns for diffusing the light are formed at predetermined intervals on the opposite side of the light emission surface of the light guide to make the illumination intensity uniform in the longitudinal direction. Examples of the patterns include prims-like structures and printed patterns for reflecting light. The intervals between the patterns are the largest immediately next to the light incident surface, and the intervals decrease with an increase in the distance from the light incident surface (see Patent Documents 1 and 2).

However, the following problem may occur with the configuration. More specifically, microscopic illumination intensity is high at a position provided with the patterns, and the intensity decreases with an increase in the distance from the patterns. Therefore, when the intervals between the patterns are large, the reduction in the illumination intensity between the patterns is large. As a result, nonuniformity of the illumination intensity is noticeable in an area with large intervals between the patterns immediately next to the light incident surface.

Particularly, if the light guide and the illuminated object approach each other for some reason, the nonuniformity of the illumination intensity is easily noticeable for the following reason. The light emitted from the light emission surface is reflected by the illuminated object, and part of the reflected light enters inside of the light guide from the light emission surface. The incident light is diffused by the patterns, and the light is emitted again toward the illuminated object from the light emission surface. Therefore, if the light guide and the illuminated object approach each other, the intensity of light incident on the light guide from the light emission surface is high, and the microscopic illumination intensity at the position provided with the patterns is also high. As a result, the nonuniformity of the illumination intensity is easily noticeable in an area with large intervals between the patterns.

Patent Document 1
Japanese Laid-open Patent Publication No. 2011-87290
Patent Document 2
Japanese Laid-open Patent Publication No. 10-112783

SUMMARY OF THE INVENTION

In view of the circumstances, an object of the present invention is to prevent or suppress nonuniformity of illumination intensity caused by patterns for diffusing light arranged on a light guide.

The present invention provides an illumination apparatus including: a light source; and a light guide formed in a rod shape, wherein an end surface in a longitudinal direction is an incident surface that receives light emitted from the light source, wherein a plurality of patterns for diffusing light are formed on the light guide, and intervals between the patterns formed in a part close to the incident surface of the patterns formed in a first area close to the incident surface are smaller than intervals between the patterns formed in a part close to the incident surface of the patterns formed in a second area farther from the incident surface than the first area.

The present invention provides an image sensor unit including: the illumination apparatus; a light condenser that receives and condenses reflected light reflected by an illuminated object after emission from the illumination apparatus; an image sensor that converts the reflected light condensed by the light condenser to an electric signal; and a circuit board provided with the image sensor.

The present invention provides an image reading apparatus that includes the image sensor unit and that reads reflected light from the illuminated object while relatively moving the image sensor unit and the illuminated object.

The present invention provides an image forming apparatus including: the image sensor unit; image reading means for reading reflected light from the illuminated object while relatively moving the image sensor unit and the illuminated object; and image forming means for forming an image on a recording medium.

BRIEF DESCRIPTION OF THE DRAWINGS

FIG. 4 is a schematic perspective view of a configuration of a diffusing surface and diffusing patterns of a light guide applied to the illumination apparatus of the first example;

FIG. 5 is a schematic external perspective view of a configuration of the light guide applied to the illumination apparatus of the first example, viewed from the side of the diffusing surface;

FIG. 6A is a schematic sectional view of a configuration of the diffusing patterns of the light guide applied to the illumination apparatus of the first example;

FIG. 6B is a schematic sectional view of the configuration of the diffusing patterns of the light guide applied to the illumination apparatus of the first example;

FIG. 9 is a schematic perspective view of a configuration of a diffusing surface and diffusing patterns of a light guide applied to an illumination apparatus of the second example;

FIG. 10A is a schematic sectional view of a configuration of the diffusing patterns of the light guide applied to the illumination apparatus of the second example;

FIG. 10B is a schematic sectional view of the configuration of the diffusing patterns of the light guide applied to the illumination apparatus of the second example;

FIG. 10C is a schematic sectional view of the configuration of the diffusing patterns of the light guide applied to the illumination apparatus of the second example;

FIG. 17B is a graph showing a result of Fourier transform of the illumination intensity in the illumination apparatus according to the example;

DETAILED DESCRIPTION OF THE PREFERRED EMBODIMENTS

Figure 1:
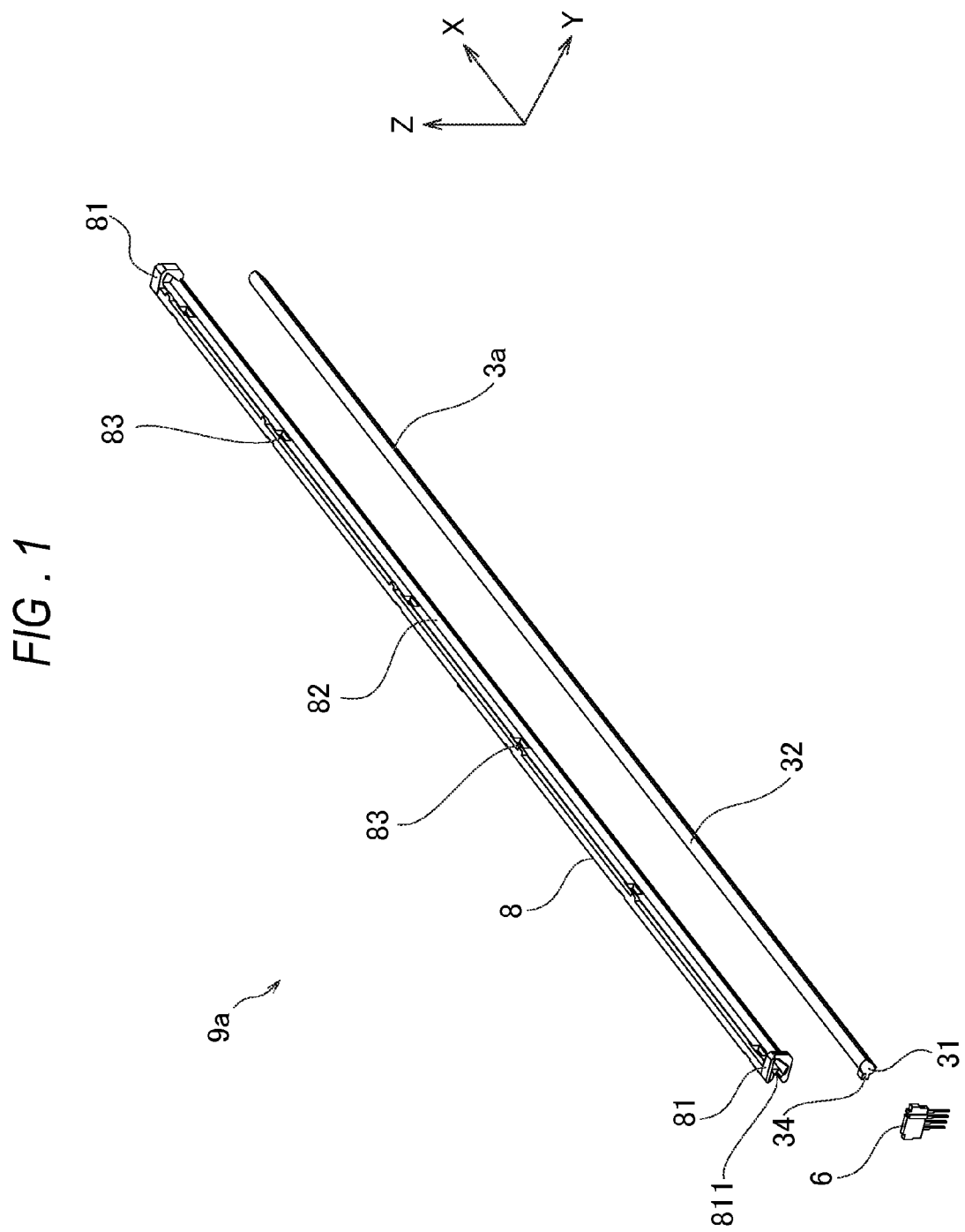
FIG. 1 is a schematic exploded perspective view of a first example of a configuration of an illumination apparatus.

Hereinafter, embodiments of the present invention will be described in detail with reference to the drawings. The embodiments of the present invention include an illumination apparatus, an image sensor unit including the illumination apparatus, and an image reading apparatus and an image forming apparatus including the image sensor unit. In the drawings, three-dimensional directions will be illustrated by arrows of X, Y, and Z. An X direction is a main-scan direction of the image sensor unit. A Y direction is a sub-scan direction of the image sensor unit. A Z direction is a vertical direction of the image sensor unit. A side closer to an illuminated object is an upper side here. The image sensor unit as an embodiment of the present invention moves in the sub-scan direction relative to an original P as an illuminated object, while the illumination apparatus emits light to the original P. The image sensor unit reads an image of the original P based on reflected light.

Illumination Apparatus

First Example

A first example of a configuration of an illumination apparatus will be described first.

Figure 2:
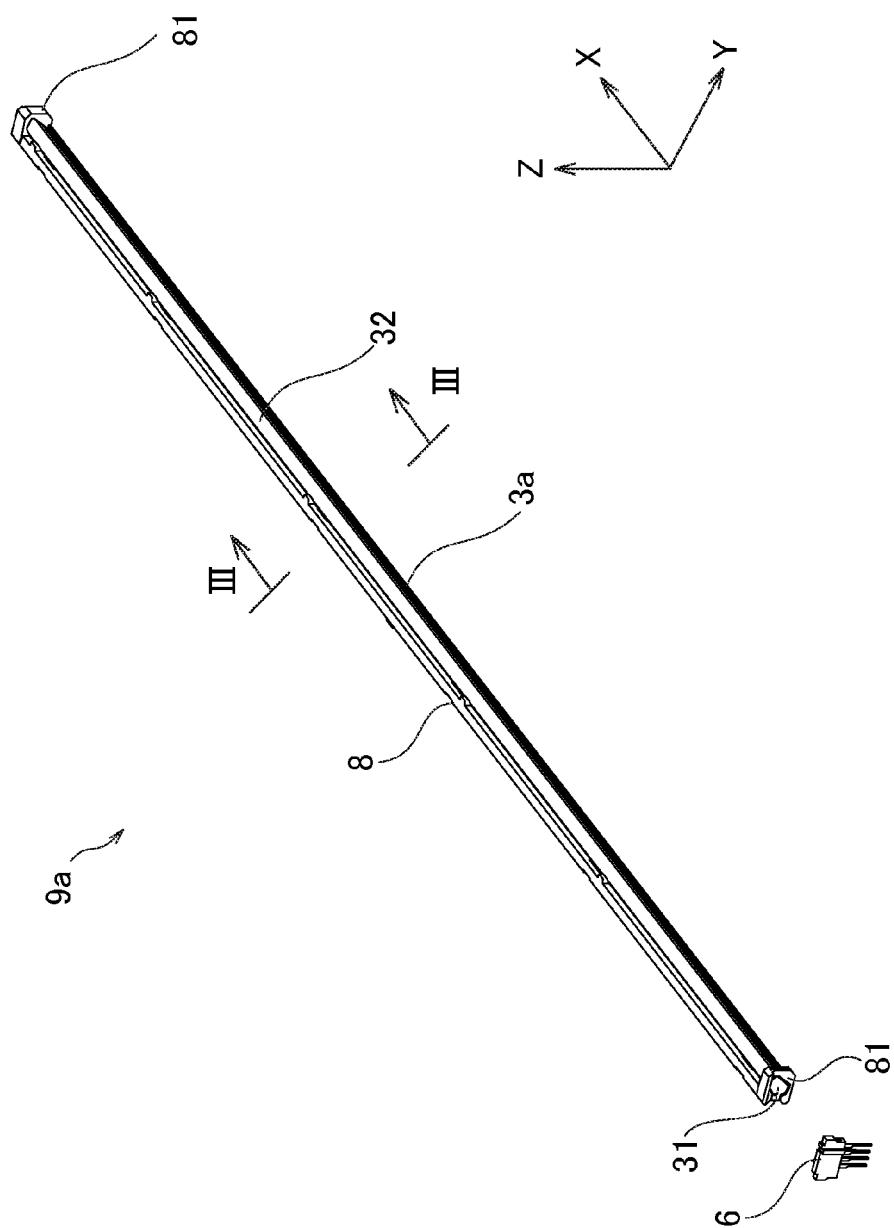
FIG. 2 is a schematic perspective view of the first example of the configuration of the illumination apparatus.
Figure 3:
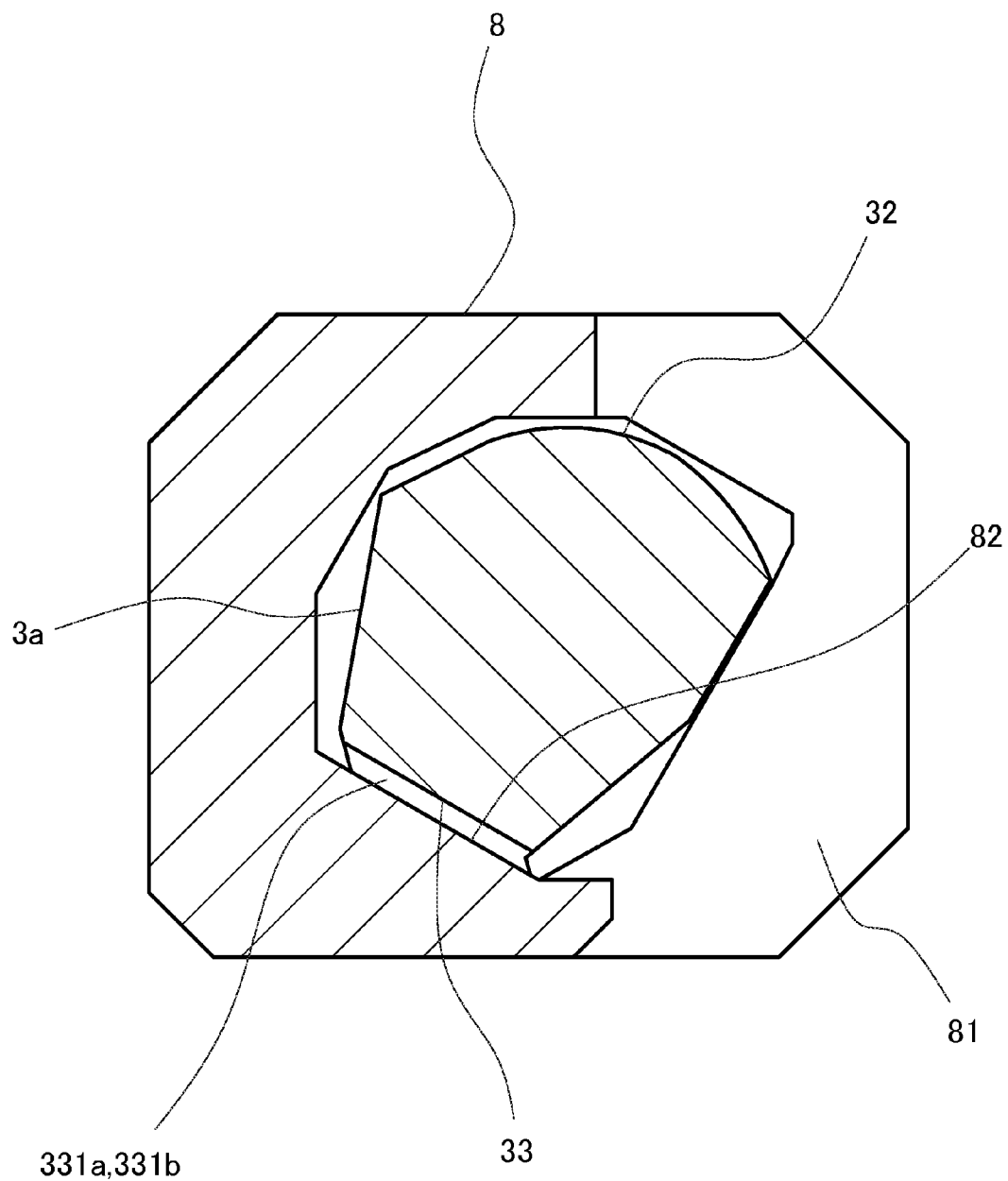
FIG. 3 is a sectional view of a III-III line of FIG. 2.

FIG. 1 is a schematic exploded perspective view of the first example of the configuration of an illumination apparatus 9a. As shown in FIG. 1, the illumination apparatus 9a includes a light guide 3a, a light guide cover 8, and a light source 6. FIG. 2 is a schematic perspective view of a state that the light guide cover 8 is attached to the light guide 3a. As shown in FIGS. 1 and 2, the light source 6 is arranged on one of the ends in the longitudinal direction of the light guide 3a in the first example of the illumination apparatus 9a. FIG. 3 is a sectional arrow view of a III-III line of FIG. 2. FIG. 3 schematically illustrates a positional relationship between the light guide 3a and the light guide cover 8 in the state that the light guide cover 8 is attached to the light guide 3a.

The light guide 3a is an optical member that converts light emitted by the light source 6 into a line light source (shapes the light into a line). The light guide 3a as a whole has a long and thin rod-like structure in the main-scan direction. The light guide 3a is made of a transparent resin material, such as an acrylic resin, and is integrally formed by injection molding or the like.

One of the end surfaces in the main-scan direction (longitudinal direction) of the light guide 3a is a light incident surface 31 that receives light emitted by the light source 6. A light emission surface 32 and a light diffusing surface 33 (see FIG. 3) are formed on side surfaces of the light guide 3a. The light emission surface 32 is a surface that emits light incident on the light incident surface 31 toward the original P. The light diffusing surface 33 is a surface for diffusing light incident on the light incident surface 31. The light emission surface 32 and the light diffusing surface 33 are formed in a long and thin band shape in the main-scan direction. The light emission surface 32 and the light diffusing surface 33 are formed on opposite sides. Details of the configuration of the light diffusing surface 33 will be described later.

In addition, an engagement portion 34 for positioning the light guide 3a and the light guide cover 8 is arranged on one of the ends of the light guide 3a. The engagement portion 34 is a convex structure protruding in a direction perpendicular to the main-scan direction.

The light guide cover 8 is a member attached to the light guide 3a. The light guide cover 8 diffuses light along with the light diffusing surface 33 of the light guide 3a. The light guide cover 8 also has a function of improving utilization efficiency of light. The light guide cover 8 is formed by, for example, a material with a high light reflectance, such as white polycarbonate mixed with titanium oxide powder.

The light guide cover 8 has a rod-like structure that is long in the main-scan direction. A cross section taken along the surface perpendicular to the main-scan direction is formed substantially in a "U" shape (particularly, see FIG. 3).

A light reflection surface 82 is arranged on the light guide cover 8. The light reflection surface 82 is a surface for reflecting light emitted to the outside from diffusing patterns (described later) of the light diffusing surface 33 of the light guide 3a to cause the light to enter inside of the light diffusing surface 33 of the light guide 3a. The light reflection surface 82 of the light guide cover 8 is formed to have a surface property of reflecting light. The light reflection surface 82 of the light guide cover 8 covers the light diffusing surface 33 of the light guide 3a or faces the light diffusing surface 33 in the state that the light guide cover 8 is attached to the light guide 3a. For example, part or all of the surface inside of the "U" shape is the light reflection surface 82. Like the light diffusing surface 33 of the light guide 3a, the light reflection surface 82 is formed in a long and thin band shape extending in the main-scan direction.

Attachment portions 81 for attachment to the light guide 3a are arranged on both ends in the main-scan direction (longitudinal direction) of the light guide cover 8. For example, the attachment portions 81 are provided with through-holes that allow insertion of the light guide 3a and that penetrate in the main-scan direction. A positioning portion 811 for positioning on the light guide 3a is formed on one of the attachment portions 81 of both ends. For example, the positioning portion 811 is a concave portion on which the engagement portion 34 of the light guide 3a is fitted.

In addition, urging portions 83 are arranged on the light guide cover 8. The urging portions 83 urge the light guide 3a to come into contact with a frame 2 (described later) of an image sensor unit 1 to thereby position the light guide 3a with respect to the frame 2. The urging portions 83 have a tongue-like structure elastically deformable in the sub-scan direction and are integrally formed on the light guide cover 8.

The light source 6 includes, for example, light emitting elements with emission wavelengths of red (R), green (G), and blue (B) colors. The light emitting elements with the emission wavelengths of the colors can be various well-known LEDs. The light source 6 is mounted on an upper surface of a circuit board 5 (described later). The illumination apparatus 9a includes two light sources 6. The two light sources 6 emit light to the light incident surfaces 31 on both ends of the light guide 3a.

The light source 6 is not limited to the configuration described above. The light source 6 can be various well-known point light sources.

The illumination apparatus 9a is assembled as follows. As shown in FIG. 2, both ends of the light guide 3a are fitted into the through-holes formed on the attachment portions 81 of the light guide cover 8. The engagement portion 34 arranged on one of the ends of the light guide 3a is fitted into the positioning portion 811 formed on one of the attachment portions 81 of the light guide cover 8. As a result, the light guide 3a and the light guide cover 8 are positioned. In this state, the light diffusing surface 33 of the light guide 3a is covered by the light reflection surface 82 of the light guide cover 8 or faces the light reflection surface 82 of the light guide cover 8. The two light sources 6 are arranged on both end surfaces in the main-scan direction that are the light incident surfaces 31 of the light guide 3a such that the light sources 6 can emit light.

Details of the configuration of the light guide 3a will be described.

The light emission surface 32 is formed in a long and thin band shape in the main-scan direction (see FIG. 1). The dimension in the main-scan direction of the light emission surface 32 is set according to the corresponding width of the original P (main-scan direction dimension). For example, to read an original P in an A3 size, the dimension in the main-scan direction of the light emission surface 32 is set to a dimension according to the width of the original P in the A3 size. To allow emission of light to a reading line O (see FIG. 13) of the original P, the light emission surface 32 is formed in, for example, a curved surface that is convex toward the reading line O of the original P (see FIG. 3).

FIG. 4 is an enlarged perspective view of part of the light guide 3a, viewed from the side of the light diffusing surface 33. The light diffusing surface 33 is formed on the opposite side of the light emission surface 32. Like the light emission surface 32, the light diffusing surface 33 is also formed in a long and thin band shape in the main-scan direction.

A plurality of diffusing patterns 331a and 331b are formed on the light diffusing surface 33, at predetermined intervals in the main-scan direction. The diffusing patterns 331a and 331b are prism structures that emit the light incident on the light incident surface 31 toward the light reflection surface 82 of the light guide cover 8. The prism structures of the diffusing patterns 331a and 331b have convex structures extending in a direction perpendicular to the main-scan direction. The prism structures of the diffusing patterns 331a and 331b are formed in a cross-sectional shape that does not completely reflect the light incident on the light incident surface 31. For example, the prism structures of the diffusing patterns 331a and 331b are formed to have a substantially triangular cross section.

According to the configuration, at least part of the light entered from the light incident surface 31 and reached the diffusing patterns 331a and 331b is emitted to the outside of the light guide 3a through the diffusing patterns 331a and 331b. The light emitted from the diffusing patterns 331a and 331b is reflected by the light reflection surface 82 of the light guide cover 8 and again enters inside of the light guide 3a from the light diffusing surface 33. The light incident on the light diffusing surface 33 advances inside of the light guide 3a and is emitted toward the original P from the light emission surface 32. As described, the light reflection surface 82 of the light guide cover 8 has a surface property of reflecting light. Therefore, the light is diffused when reflected by the light reflection surface 82.

FIG. 5 is a perspective view of the light guide 3a viewed from the side of the light diffusing surface 33 and is a diagram schematically showing areas where the dimensions of the diffusing patterns 331a and 331b are different. When one of the ends in the main-scan direction is the light incident surface 31 (when the light source 6 is arranged on one of the ends), the dimensions of the diffusing patterns 331a and 331b are different at least in an area A (first area) close to the light incident surface 31 and an area B (second area) at a position farther from the light incident surface 31 than the area A.

Figure 6C:
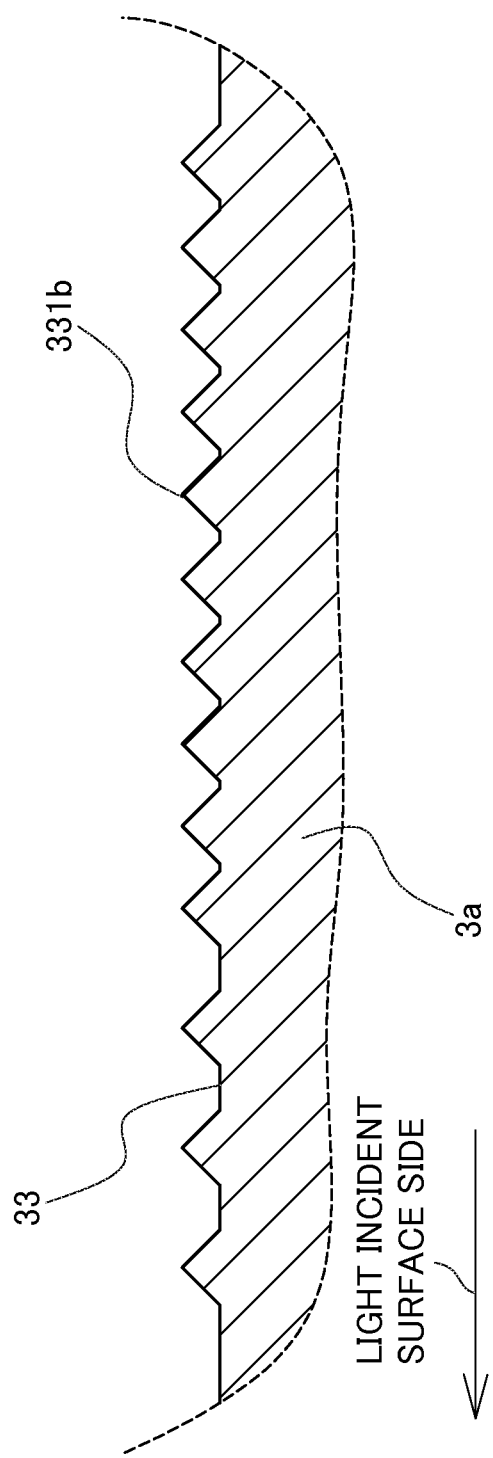
FIG. 6C is a schematic sectional view of the configuration of the diffusing patterns of the light guide applied to the illumination apparatus of the first example.

FIGS. 6A to 6C are schematic sectional views of the dimensions of the diffusing patterns 331a and 331b and the intervals between the diffusing patterns 331a and 331b. FIG. 6A shows an end closer to the light incident surface 31 (VI-A section of FIG. 5). FIG. 6B shows a boundary portion of the areas A and B (VI-B section of FIG. 5). FIG. 6C shows an end on the opposite side of the light incident surface 31 (VI-C section of FIG. 5).

As shown in FIGS. 6A to 6C, the dimension of the diffusing patterns 331a in the area A closer to the light incident surface 31 is smaller than the dimension of the diffusing patterns 331b in the area B farther from the light incident surface 31. For example, the height and the width (main-scan direction dimension) are small. The reduction in the dimension can reduce the effect of light emission per diffusing pattern 331a in the area A, compared to the diffusing pattern 331b in the area B.

The intervals between the diffusing patterns 331a and 331b in the areas A and B are the largest at the ends closer to the light incident surface 31, and the intervals decrease with an increase in the distance from the light incident surface 31. Specifically, the intervals between the diffusing patterns 331a in the area A are the largest at the end closer to the light incident surface 31 and the smallest at the boundary portion with the area B as shown in FIGS. 6A and 6B. The intervals between the diffusing patterns 331b in the area B are the largest at the boundary portion with the area A and the smallest at the end on the opposite side (end on the opposite side of the light incident surface 31) as shown in FIGS. 6B and 6C.

As shown in FIGS. 6A and 6B, a largest interval P1 between the diffusing patterns 331a in the area A is smaller than a largest interval P3 between the diffusing patterns 331b in the area B. In this case, a smallest interval P2 between the diffusing patterns 331a in the area A is smaller than the largest interval P3 between the diffusing patterns 331b in the area B as shown in FIG. 6B. In this way, it is only necessary that the intervals between the diffusing patterns 331a and 331b decrease with an increase in the distance from the light incident surface 31 in the areas A and B. Therefore, the intervals between the diffusing patterns 331a and 331b may not decrease with an increase in the distance from the light incident surface 31 throughout the entire light diffusing surface 33.

According to the configuration, the effect of light emission per unit length in the main-scan direction is the smallest at the end closer to the light incident surface 31 and increases with an increase in the distance from the light incident surface 31 in the areas A and B.

The intervals between the diffusing patterns 331a and 331b in the areas A and B may smoothly change or gradually change.

However, the dimensions of the diffusing patterns 331a and 331b and the intervals between the diffusing patterns 331a and 331b are determined such that the effect of light emission per unit length in each section of the areas A and B fulfills the following relationship.

End in area B on opposite side of light incident surface 31

>end in area $B$ closer to area $A$

≥end in area $A$ closer to area $B$

>end in area $A$ closer to light incident surface 31 (relational expression (1))

More specifically, the effect of light emission per unit length is the smallest at the end closer to the light incident surface 31 and increases with an increase in the distance from the light incident surface 31, throughout the entire light diffusing surface 33.

The effect of light emission per unit length in the areas A and B can be determined by defining the dimensions of the diffusing patterns 331a and 331b and the intervals between the diffusing patterns 331a and 331b.

In this way, the dimension of the diffusing patterns 331a is reduced, and the intervals between the diffusing patterns 331a are reduced at the end closer to the light incident surface 31 of the area A. As a result, the effect of emitting light toward the light reflection surface 82 of the light guide cover 8 can be reduced at the part compared to the end on the opposite side of the light incident surface 31, and the nonuniformity of the illumination intensity caused by the diffusing patterns 331a can be prevented or suppressed.

More specifically, the microscope illumination intensity is high at the positions provided with the diffusing patterns 331a and 331b and decreases with an increase in the distance from the diffusing patterns 331a and 331b as described above. Therefore, when the intervals between the diffusing patterns 331a and 331b are large, the reduction in the illumination intensity is large between the diffusing patterns 331a and 331b. As a result, the illumination intensity tends to be nonuniform near the light incident surface 31 where the intervals between the diffusing patterns 331a are the largest.

On the other hand, the dimension of the diffusing patterns 331a in the area A close to the light incident surface 31 is smaller than that of the diffusing patterns 331b in the area B farther from the light incident surface 31 according to the present embodiment. As a result, the intervals between the diffusing patterns 331a near the light incident surface 31 can be reduced while fulfilling the relational expression (1). Therefore, the reduction in the illumination intensity with an increase in the distance from the light incident surface 31 can be prevented or suppressed, and the nonuniformity of the illumination intensity near the light incident surface 31 can be prevented or suppressed.

According to the configuration, nonuniformity in the output of an image sensor 7 (described later) can be prevented or suppressed even when the distance between the illumination apparatus 9a and the original P is changed (particularly, when the illumination apparatus 9a and the original P approach each other) in a state that the illumination apparatus 9a is incorporated into the image sensor unit 1.

This is for the following reason. Part of the light reflected by the original P enters inside of the light guide 3a from the light emission surface 32. The light incident on the light emission surface 32 is emitted to the light reflection surface 82 of the light guide cover 8 through the diffusing patterns 331a and 331b. The light reflected by the light reflection surface 82 is incident on the light guide 3a and emitted again toward the original P from the light emission surface 32. Therefore, if the light guide 3a and the original P approach each other for some reason, the intensity of light reflected by the original P and incident on the light guide 3a from the light emission surface 32 is high. Thus, the microscopic illumination intensity at the positions provided with the diffusing patterns 331a and 331b is also high. As a result, the illumination intensity is nonuniform at the parts with large intervals between the diffusing patterns 331a.

For example, in a flat-bed type scanner, an original supporting body (cover glass) maintains a predetermined distance between the image sensor 7 and the original P. However, if the weight of the original P is large, the original supporting body is bent, and the distance between the light guide of the illumination apparatus 9a and the original P may be small. When the user presses the original P against the original supporting body, the original supporting body may be bent by the force, and the distance between the light guide 3a of the illumination apparatus 9a and the original P may be small. Consequently, the illumination intensity may be nonuniform at the positions with large intervals between the diffusing patterns 331a as described above.

On the other hand, the intervals between the diffusing patterns 331a near the light incident surface 31 can be reduced according to the present embodiment. Therefore, even when the distance between the light guide 3a and the original P is changed, the nonuniformity of the illumination intensity near the light incident surface 31 can be prevented or suppressed.

The diffusing patterns 331a and 331b are not limited to the convex structures extending in the main-scan direction as described above. For example, the diffusing patterns 331a and 331b may be printed patterns made of a light reflective paint and formed by silk screen printing. In this case, it is only necessary that the dimensions of the printed patterns as the diffusing patterns 331a and 331b are different in the areas A and B.

Illumination Apparatus

Second Example

A second example of the configuration of the illumination apparatus will be described. An illumination apparatus 9b of the second example includes a light guide 3b in which both end surfaces in the main-scan direction are the light incident surfaces 31, and the light sources 6 are arranged on both ends in the main-scan direction of the light guide 3b. The same components as those of the first example are designated with the same reference numerals, and the description will not be repeated.

Figure 7:
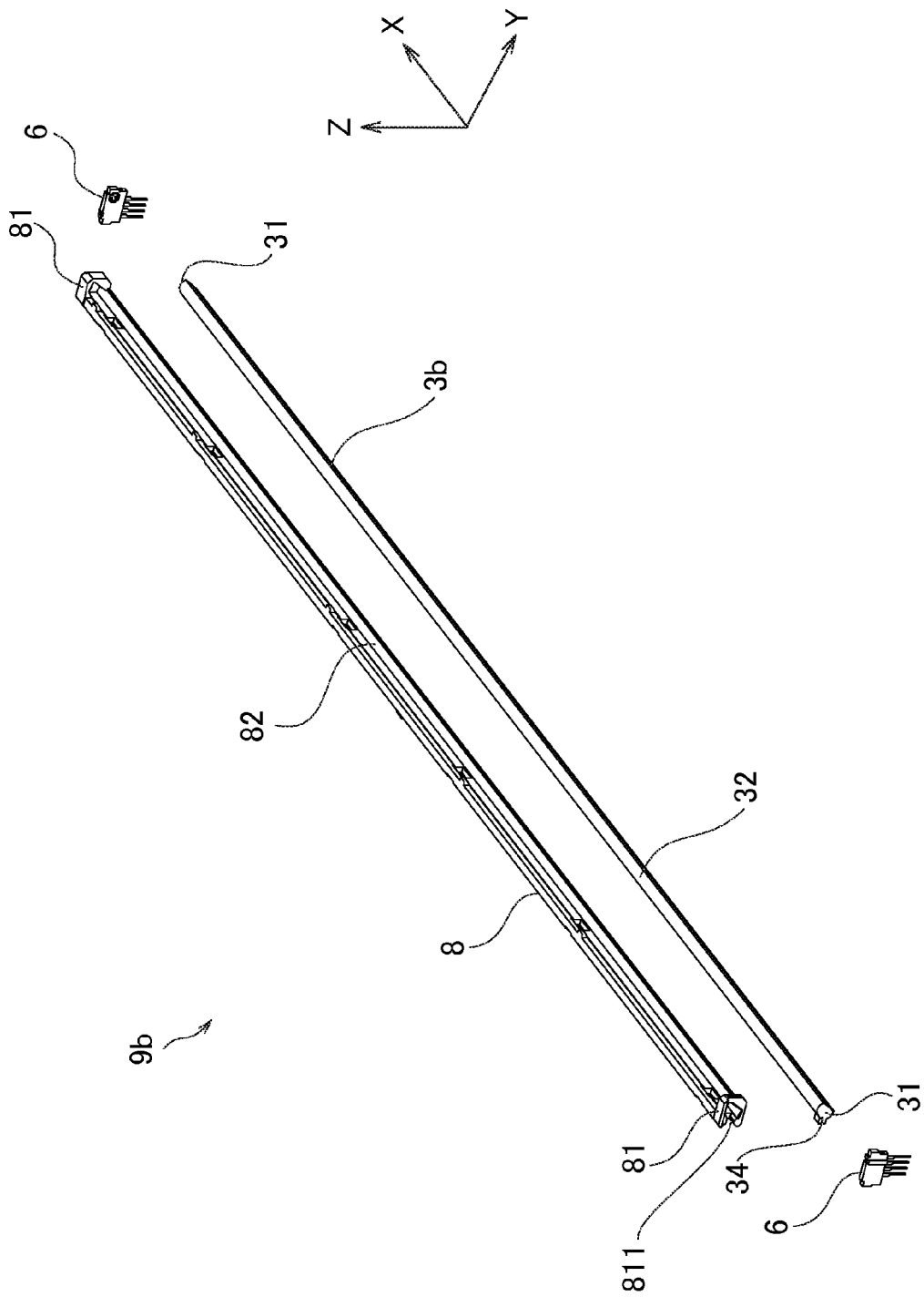
FIG. 7 is a schematic exploded perspective view of a second example of the configuration of the illumination apparatus.
Figure 8:
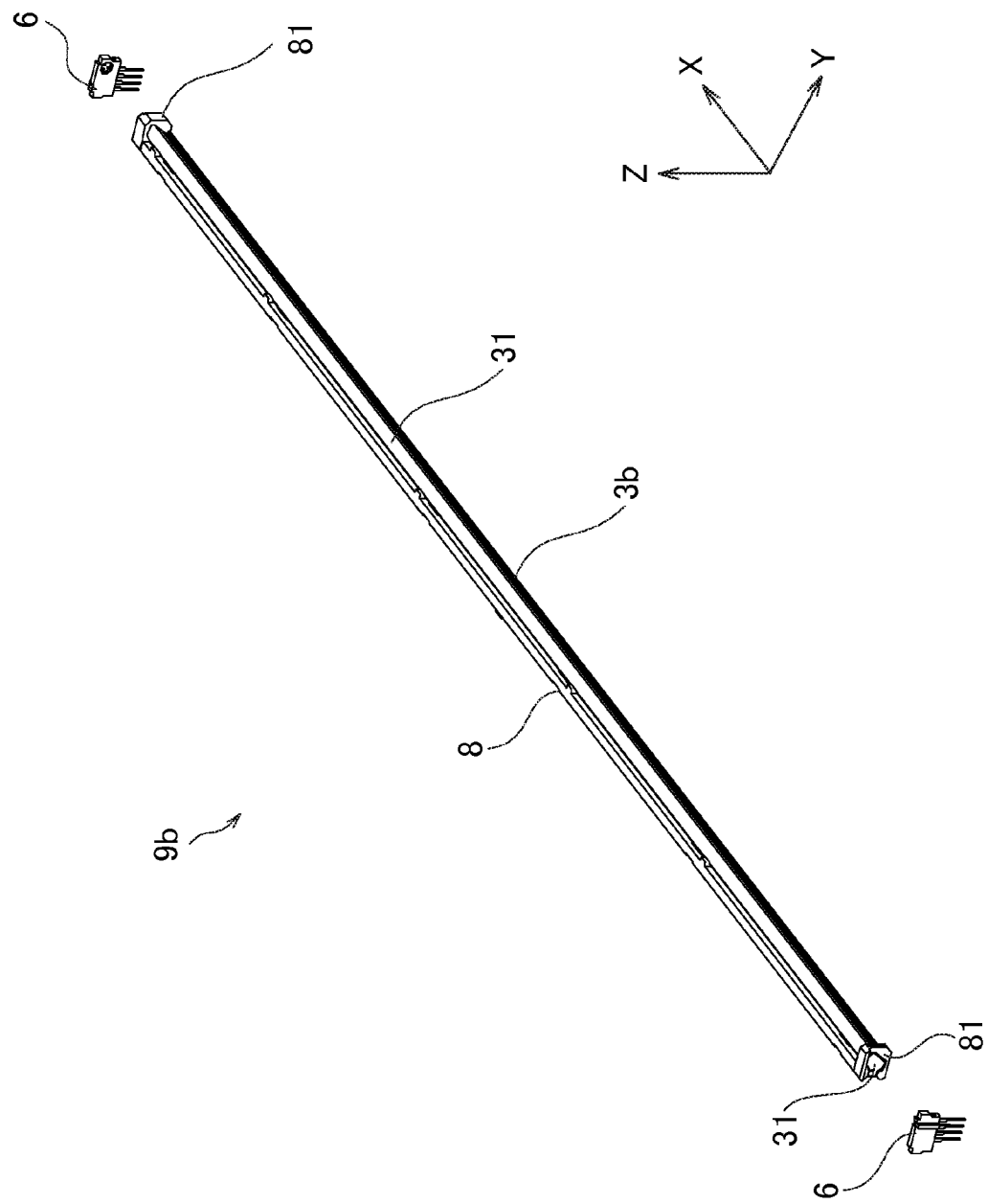
FIG. 8 is a schematic external perspective view of the second example of the configuration of the illumination apparatus.

FIG. 7 is a schematic exploded perspective view of a configuration example of the illumination apparatus 9b. As shown in FIG. 7, the illumination apparatus 9b includes the light guide 3b, the light guide cover 8, and the light sources 6. FIG. 8 is a schematic perspective view of a state that the light guide cover 8 is attached to the light guide 3b.

Both end surfaces in the main-scan direction (longitudinal direction) of the light guide 3b are the light incident surfaces 31 that receive light emitted by the light sources 6. When the light guide cover 8 is attached to the light guide 3b, the light diffusing surface 33 of the light guide 3b is covered by the light diffusing surface 82 of the light guide cover 8, or the light diffusing surface 33 faces the light reflection surface 82 of the light guide cover 8 as in the first example (see FIG. 3). The illumination apparatus 9b includes two light sources 6, and the two light sources 6 are arranged to be able to emit light to the light incident surfaces 31 on both ends of the light guide 3b.

The dimensions of the diffusing patterns 331a and 331b vary according to the position in the main-scan direction.

FIG. 9 is a perspective view of the light guide 3b viewed from the light diffusing surface 33 and is a diagram schematically showing areas with different dimensions of the diffusing patterns 331a and 331b. When both ends in the main-scan direction are the light incident surfaces 31, the dimensions of the diffusing patterns 331a and 331b are different at least in two areas C and E closer to both ends in the main-scan direction and an area D between the areas C and E that is an intermediate part in the main-scan direction. However, the dimensions of the diffusing patterns 331b may be the same in the areas C and E.

FIGS. 10A to 10C are schematic sectional views of dimensions of the diffusing patterns 331a and 331b and intervals between the diffusing patterns 331a and 331b. FIG. 10A shows an end in the main-scan direction (X-A section of FIG. 9). FIG. 10B shows a boundary portion of the areas C and D (X-B section of FIG. 9). FIG. 10C shows a center portion in the main-scan direction (X-C section of FIG. 9).

As shown in FIGS. 10A to 10C, the dimension of the diffusing patterns 331a in the areas C and E closer to the light incident surfaces 31 (closer to both ends) is smaller than the dimension of the diffusing patterns 331b of the area D between the areas C and E that is far from the light incident surfaces 31. As a result, the effect of light emission per diffusing pattern 331a in the areas C and E can be smaller than that of the diffusing pattern 331b of the area D.

The intervals between the diffusing patterns 331a and 331b in the areas C to E are the largest at the ends closer to the light incident surfaces 31, and the intervals decrease with an increase in the distance from the light incident surfaces 31. Specifically, the intervals between the diffusing patterns 331a in the areas C and E are the largest at the ends closer to the light incident surfaces 31 as shown in FIGS. 10A and 10B and are the smallest at the boundary portions with the area D. Although FIGS. 10A and 10B illustrate the area C, the same applies to the area E. The intervals between the diffusing patterns 331b in the area D are the largest at the boundary portion with the area C and the boundary portion with the area E and are the smallest at the center in the main-scan direction as shown in FIGS. 10B and 10C.

As shown in FIGS. 10A and 10B, a smallest interval P4 between the diffusing patterns 331a in the areas C and E is smaller than a smallest interval P6 between the diffusing patterns 331b in the area D. In this case, a smallest interval P5 between the diffusing patterns 331a in the areas C and E is smaller than the largest interval P6 between the diffusing patterns 331b in the area D. In this way, it is only necessary that the intervals between the diffusing patterns 331a and 331b decrease with an increase in the distance from the light incident surfaces 31 in the areas C to E. Therefore, the intervals between the diffusing patterns 331a and 331b may not decrease with an increase in the distance from the light incident surfaces 31 throughout the entire light diffusing surface 33.

According to the configuration, the effect of light emission per unit length in the main-scan direction is the smallest at the ends closer to the light incident surfaces 31 and increases with an increase in the distance from the light incident surfaces 31 in the areas C to E of the light diffusing surface 33.

The intervals between the diffusing patterns 331a and 331b in the areas C to E may smoothly change or gradually change.

However, the dimensions of the diffusing patterns 331a and 331b and the intervals between the diffusing patterns 331a and 331b are determined such that the effect of light emission per unit length in the areas C to E fulfills the following relationship.

Center in main-scan direction of area D (center in main-scan direction of light diffusing surface 33)

>ends in area D closer to end of area C and closer to area E

≥ends in areas C and E closer to area D

>ends in areas C and E closer to light incident surfaces 31     (relational expression (2))

As in the first example, the effect of light emission per unit length is the smallest at both ends in the main-scan direction and increases with an increase in the distance from the light incident surface 31 throughout the entire light diffusing surface 33.

The configuration can attain the same effect as in the first example.

(Image Sensor Unit)

Figure 11:
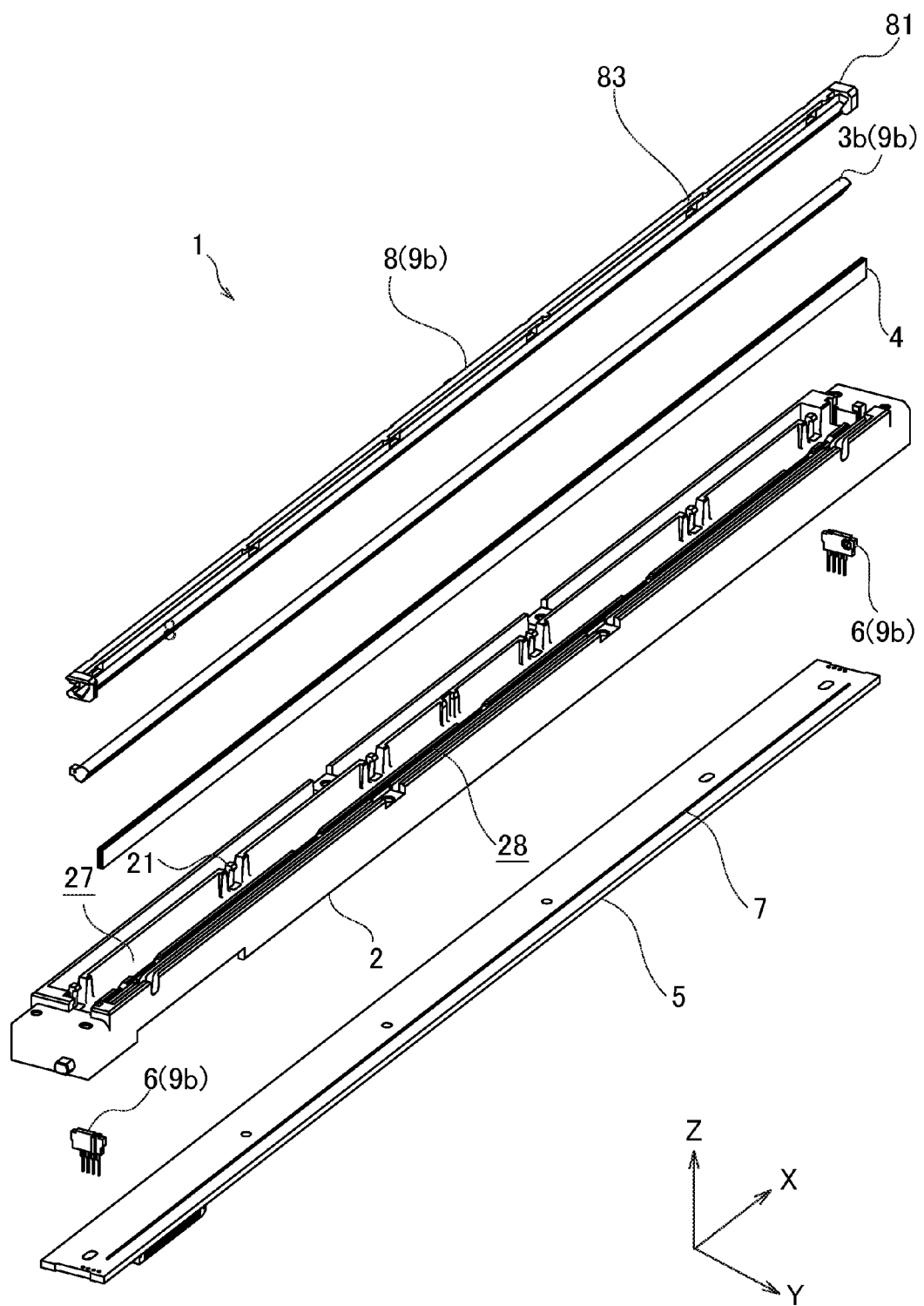
FIG. 11 is a schematic exploded perspective view of a configuration of an image sensor unit.
Figure 12:
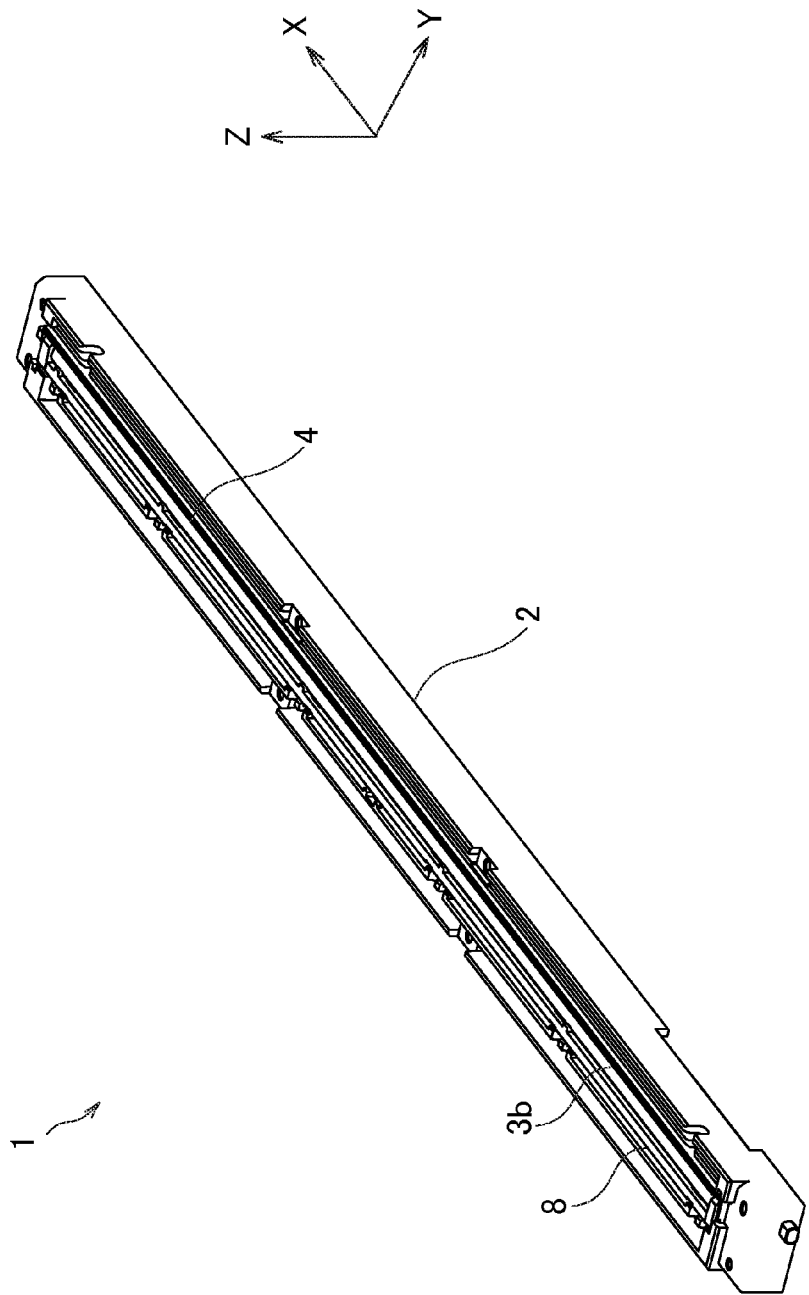
FIG. 12 is a schematic external perspective view of the configuration of the image sensor unit.
Figure 13:
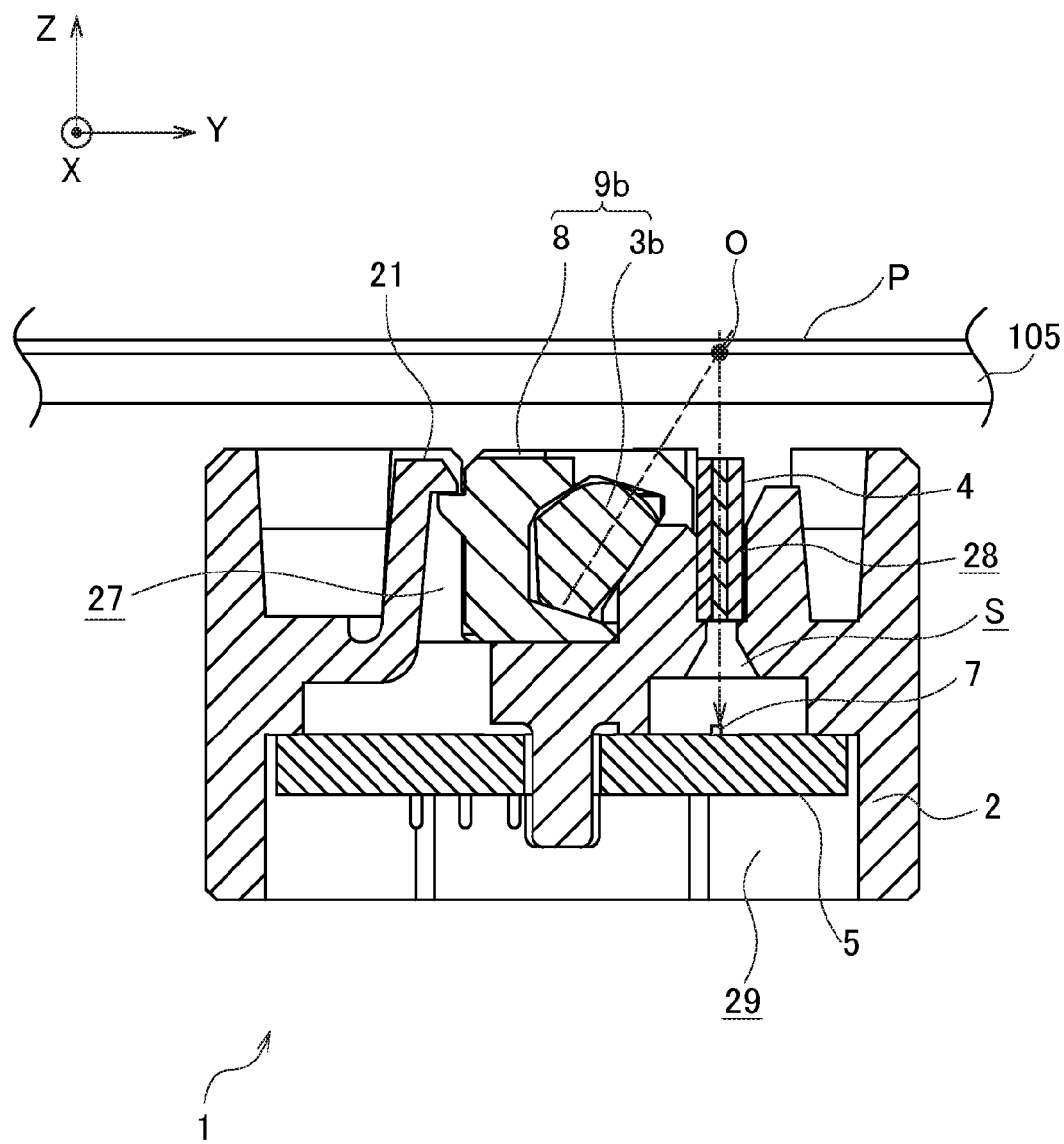
FIG. 13 is a schematic sectional view of an internal structure of the image sensor unit.

A configuration of the image sensor unit 1 will be described with reference to FIGS. 11 to 13. FIG. 11 is a schematic exploded perspective view of the configuration of the image sensor unit 1. FIG. 12 is a schematic external perspective view of the configuration of the image sensor unit 1. FIG. 13 is a schematic sectional view of an internal structure of the image sensor unit 1 taken along a surface perpendicular to the main-scan direction.

As shown in FIGS. 11 to 13, the image sensor unit 1 has a rectangular solid shape that is long in the main-scan direction. The image sensor unit 1 includes: one of the illumination apparatuses 9a and 9b (light source 6, light guides 3a and 3b, and light guide cover 8) of the first and second examples; the frame 2; a light condenser 4; the circuit board 5; and the image sensor 7. Although the illumination apparatus 9b of the second example is applied in FIGS. 11 to 13, the same applies to the first example except that the number of light sources 6 is smaller.

The frame 2 is a housing of the image sensor unit 1. The light guides 3a and 3b provided with the light guide cover 8, the light condenser 4, and the circuit board 5 provided with the image sensor 7 and the light sources 6 are housed and attached to the frame 2. The frame 2 is integrally formed by, for example, a light-blocking resin material colored in black. The resin material can be, for example, polycarbonate.

As shown in FIGS. 11 and 12, the frame 2 is a substantially rectangular solid member that is long in the main-scan direction.

A light guide housing chamber 27, a light condenser housing chamber 28, and a circuit board housing chamber 29 (see FIG. 13) are formed on the frame 2. The light guide housing chamber 27 is an area that opens to the upper side, and the light guides 3a and 3b provided with the light guide cover 8 can be housed. The light condenser housing chamber 28 is an area that opens to the upper side, and the light condenser 4 can be housed. The circuit board housing chamber 29 is an area that opens to the lower side, and the circuit board 5 provided with the light sources 6 and the image sensor 7 can be housed. The frame 2 is provided with an opening S for linking the light condenser housing chamber 28 and the circuit board housing chamber 29, allowing the light to pass through.

In addition, the frame 2 is provided with a holding claw 21 that positions and fixes the light guide cover 8 housed in the light guide housing chamber 27. The holding claw 21 is an elastically deformable structure protruding inside of the light guide housing chamber 27 and is integrated with the frame 2.

The light condenser 4 is an optical member that focuses reflected light from the original P on the surface of the image sensor 7. The light condenser 4 is, for example, a rod-lens array including a plurality of imaging elements (rod lenses) of an erect equal magnification imaging type linearly arranged in the main-scan direction. It is only necessary that the light condenser 4 includes linearly arranged imaging elements, and the configuration is not limited. For example, the light condenser 4 may include imaging elements arranged in a plurality of lines. The light condenser 4 can be an optical member with various well-known light condensing functions, such as various micro-lens arrays.

The image sensor 7 converts reflected light focused by the light condenser 4 to an electric signal. The image sensor 7 is, for example, an image sensor IC array. The image sensor IC array includes a plurality of image sensor ICs linearly mounted on the surface of the circuit board 5 in the main-scan direction. The image sensor ICs are a plurality of light receiving elements (may also be called photoelectric conversion elements) corresponding to the resolution of reading by the image sensor unit 1. In this way, the image sensor 7 includes a plurality of image sensor ICs (light receiving elements) linearly arranged in the main-scan direction. It is only necessary that the image sensor 7 includes a plurality of linearly arranged image sensor ICs, and other configurations are not particularly limited. For example, the image sensor ICs may be arranged in a plurality of lines to form a staggered arrangement. The image sensor 7 and the image sensor ICs included in the image sensor IC array can be various well-known image sensors and image sensor ICs.

The circuit board 5 has a rectangular shape that is long in the main-scan direction. The image sensor 7 and the light sources 6 are mounted on the upper surface of the circuit board 5. As shown in FIG. 11, the two light sources 6 are mounted near the ends in the main-scan direction of the circuit board 5 so as to emit light toward the center in the main-scan direction. The image sensor 7 is mounted with the light receiving surface facing upward so as to receive light from the light condenser 4. Connectors and the like for wire connection to the outside are further mounted on the circuit board 5.

In addition, the image sensor unit 1 is provided with attachment portions for attachment to an image reading apparatus 10 (described later) or an image forming apparatus 50 (described later) and a connector for electrical connection to the image reading apparatus 10 or the image forming apparatus 50. The configurations of the attachment portions and the connector are not particularly limited. It is only necessary that the attachment portions allow attachment of the image sensor unit 1 to the image reading apparatus 10 or the image forming apparatus 50. It is only necessary that the connector can connect the image sensor unit 1 with a predetermined device of the image reading apparatus 10 or the image forming apparatus 50, allowing transmission and reception of power and electric signals.

As shown in FIGS. 11 to 13, the light guides 3a and 3b provided with the light guide cover 8 are housed in the light guide housing chamber 27 of the frame 2. Consequently, the holding claw 21 arranged in the frame 2 is engaged with the light guide cover 8. As a result, the light guides 3a and 3b and the light guide cover 8 are housed and held in the light guide housing chamber 27. As shown in FIG. 13, the side surfaces of the light guides 3a and 3b are maintained in a state of contact with the inner surface of the light guide housing chamber 27 by urging force of the urging portions 83 of the light guide cover 8. As a result, the light guides 3a and 3b and the light guide cover 8 are positioned on the frame 2.

The light condenser 4 is housed in the light condenser housing chamber 28 of the frame 2. The circuit board 5 provided with the light sources 6 and the image sensor 7 is housed in the circuit board housing chamber 29.

The light guides 3a and 3b are housed in the light guide housing chamber 27, and the circuit board 5 provided with the two light sources 6 is housed in the circuit board housing chamber 29. As a result, the two light sources 6 face the light incident surfaces 31 formed on both ends of the light guide 3b. When the circuit board 5 provided with one light source 6 is housed in the circuit board housing chamber 29, the light source 6 faces the light incident surface 31 of one of the ends of the light guide 3a. Therefore, the light emitted by one or two light sources 6 is incident on the light incident surface 31 formed on one or both ends of the light guides 3a and 3b.

To emit light to the original P, the light sources 6 sequentially turn on the light emitting elements of each color. The light emitted by the light sources 6 enters inside from the light incident surfaces 31 of the light guides 3a and 3b, and the light is reflected by the light diffusing surface 33 or other reflection surfaces and propagates inside. The light is emitted toward the reading line O of the original P from the light emission surface 32 of the light guides 3a and 3b. As shown in FIG. 13, an original supporting body 105 (described later) is arranged on the upper side of the image sensor unit 1 in a state that the image sensor unit 1 is incorporated into the image reading apparatus 10 or the image forming apparatus 50. The illumination apparatuses 9a and 9b of the image sensor unit 1 emit light toward the reading line O of the original P placed on the original supporting body 105. The light condenser 4 condenses the reflected light from the reading line O of the original P on the surface of the image sensor 7. The image sensor 7 converts an optical image formed by the light condenser 4 to an electric signal.

The image sensor unit 1 performs the operation while moving in the sub-scan direction relative to the original P. As a result, the image sensor unit 1 can read the original P.

(Image Reading Apparatus)

Figure 14:
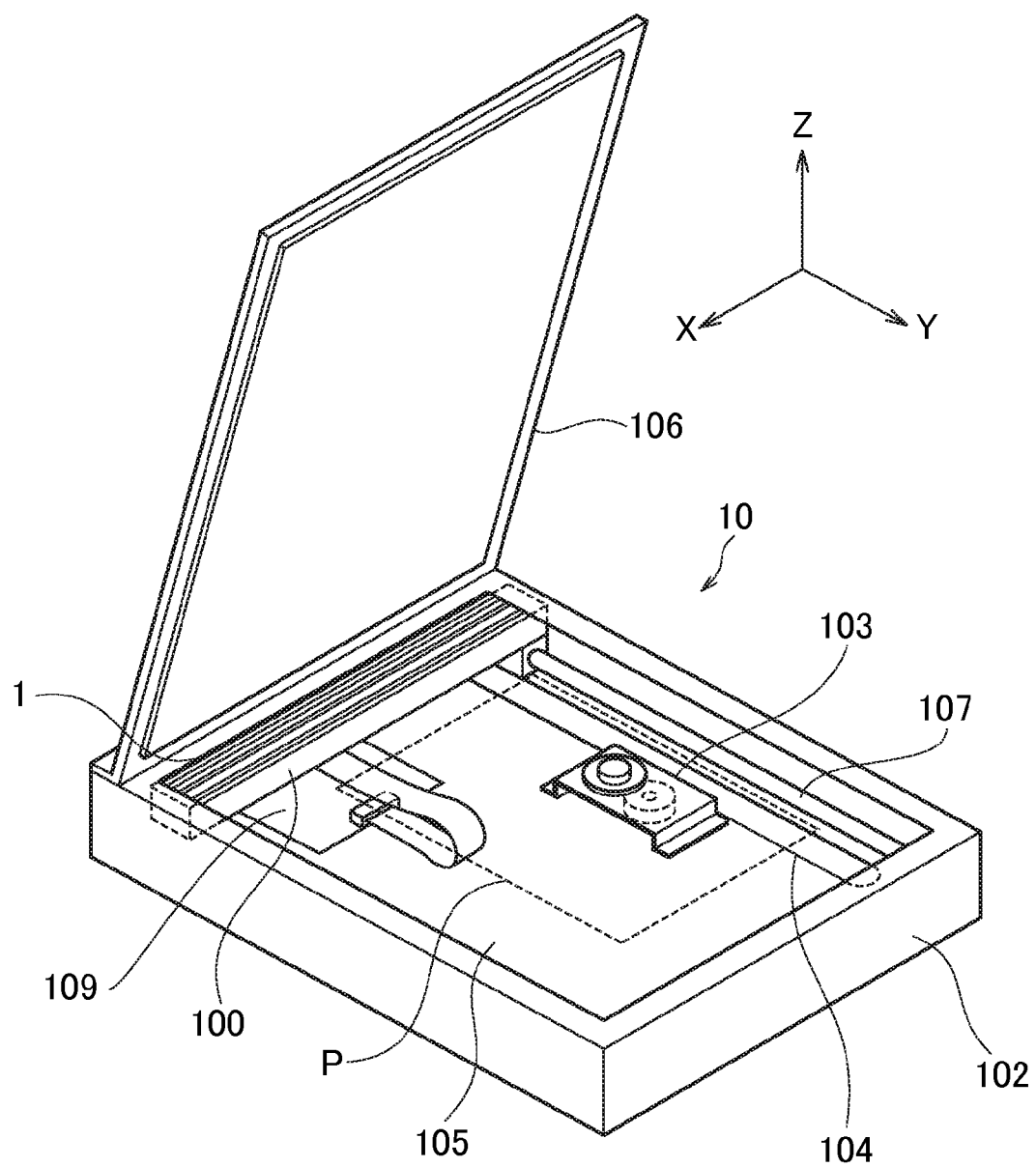
FIG. 14 is an external perspective view of an image reading apparatus as an embodiment of the present invention.

The image reading apparatus 10 as an embodiment of the present invention will be described with reference to FIG. 14. The image sensor unit 1 as an embodiment of the present invention is applied to the image reading apparatus 10 as an embodiment of the present invention. FIG. 14 is an external perspective view of the image reading apparatus 10 as an embodiment of the present invention. As shown in FIG. 14, the image reading apparatus 10 as an embodiment of the present invention is a flat-bed type scanner, and the image sensor unit 1 as an embodiment of the present invention is incorporated. The image reading apparatus 10 as an embodiment of the present invention includes a housing 102, a unit table 100, and a unit table driving mechanism. The unit table 100 is a member on which the image sensor unit 1 as an embodiment of the present invention can be mounted. The unit table driving mechanism is a mechanism for moving the unit table 100 provided with the image sensor unit 1 in the sub-scan direction. For example, the unit table driving mechanism includes: a driving motor 103; a wire 104 that transmits power of the drive motor 103 to the unit table 100; and a guide shaft 107 that guides the unit table 100. The configurations of the unit table 100 and the unit table driving mechanism are not particularly limited, and well-known configurations can be applied. The original supporting body 105 is arranged on the upper surface of the housing 102. The original supporting body 105 is, for example, a transparent glass plate. A pressure plate 106 is further attached to an end in the sub-scan direction of the housing 102, and the pressure plate 106 can be freely opened and closed by a hinge or the like. The pressure plate 106 has a function of holding the original P placed on the upper surface of the original supporting body 105.

The operation and usage of the image reading apparatus 10 as an embodiment of the present invention are as follows. The original P is placed facing downward on the upper surface of the original supporting body 105, and the pressure plate 106 is closed. The drive motor 103 is driven to move the wire 104 to thereby move the image sensor unit 1 in the sub-scan direction. In this case, the guide shaft 107 guides the unit table 100. As a result, the image sensor unit 1 moves in the sub-scan direction relative to the original P. Each reading line of the image of the original P is read while moving the image sensor unit 1. A signal processing unit 109 applies image processing to the image read by the image sensor unit 1 as necessary, and image data is stored. As a result, reading of the original P is completed.

Since the image sensor unit 1 as an embodiment of the present invention is applied to the image reading apparatus 10 as an embodiment of the present invention, the illumination intensity of the illumination light emitted to the original P can be made uniform. Particularly, the illumination intensity near the light incident surface 31 of the light guides 3a and 3b can be made uniform.

The same configurations as in a well-known image reading apparatus can be applied to the parts not described in the image reading apparatus 10 as an embodiment of the present invention.

Although the flat-bed type scanner has been described as the image reading apparatus 10, a sheet-feed type scanner can also be applied.

(Image Forming Apparatus)

Figure 15:
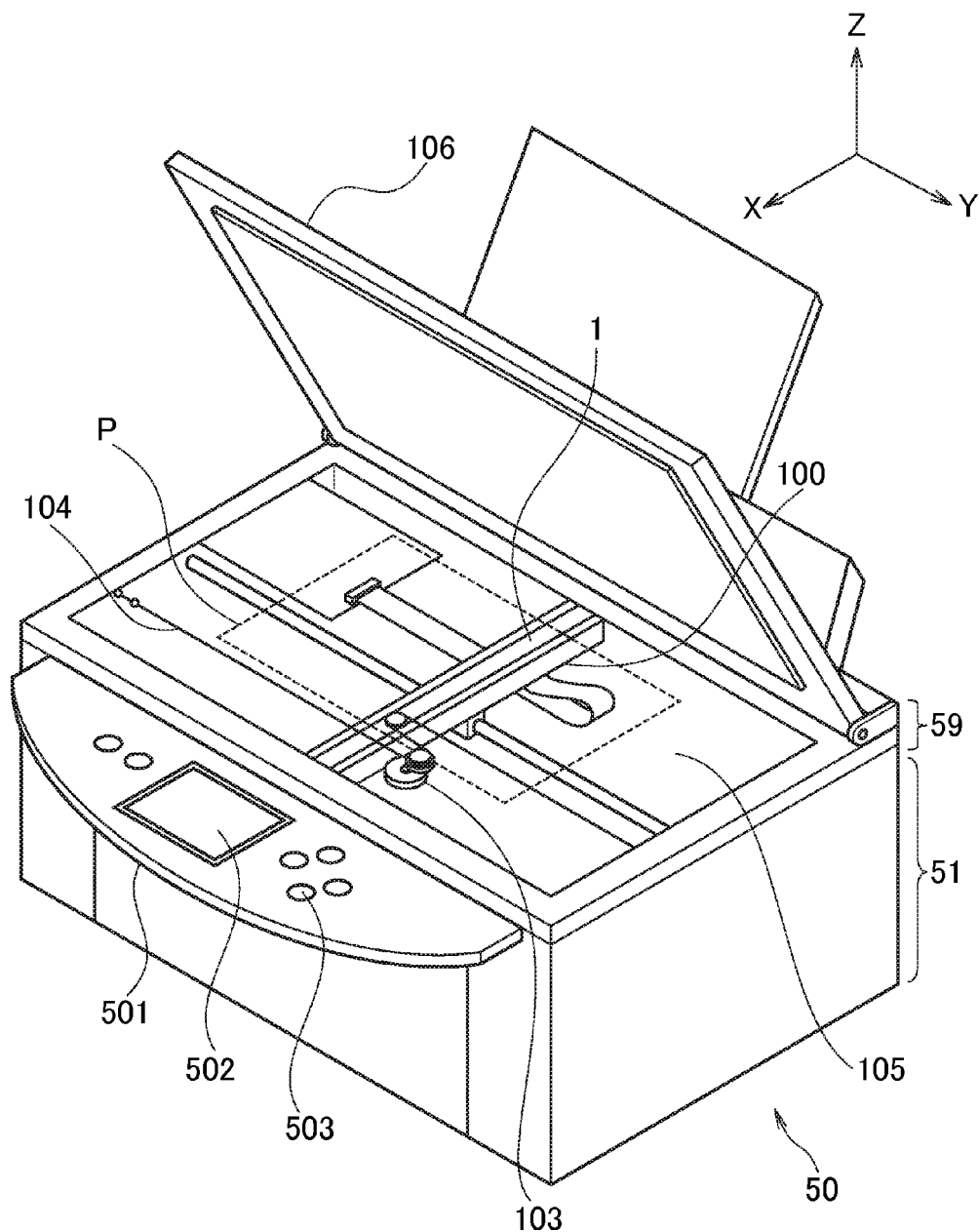
FIG. 15 is an external perspective view of an image forming apparatus as an embodiment of the present invention.
Figure 16:
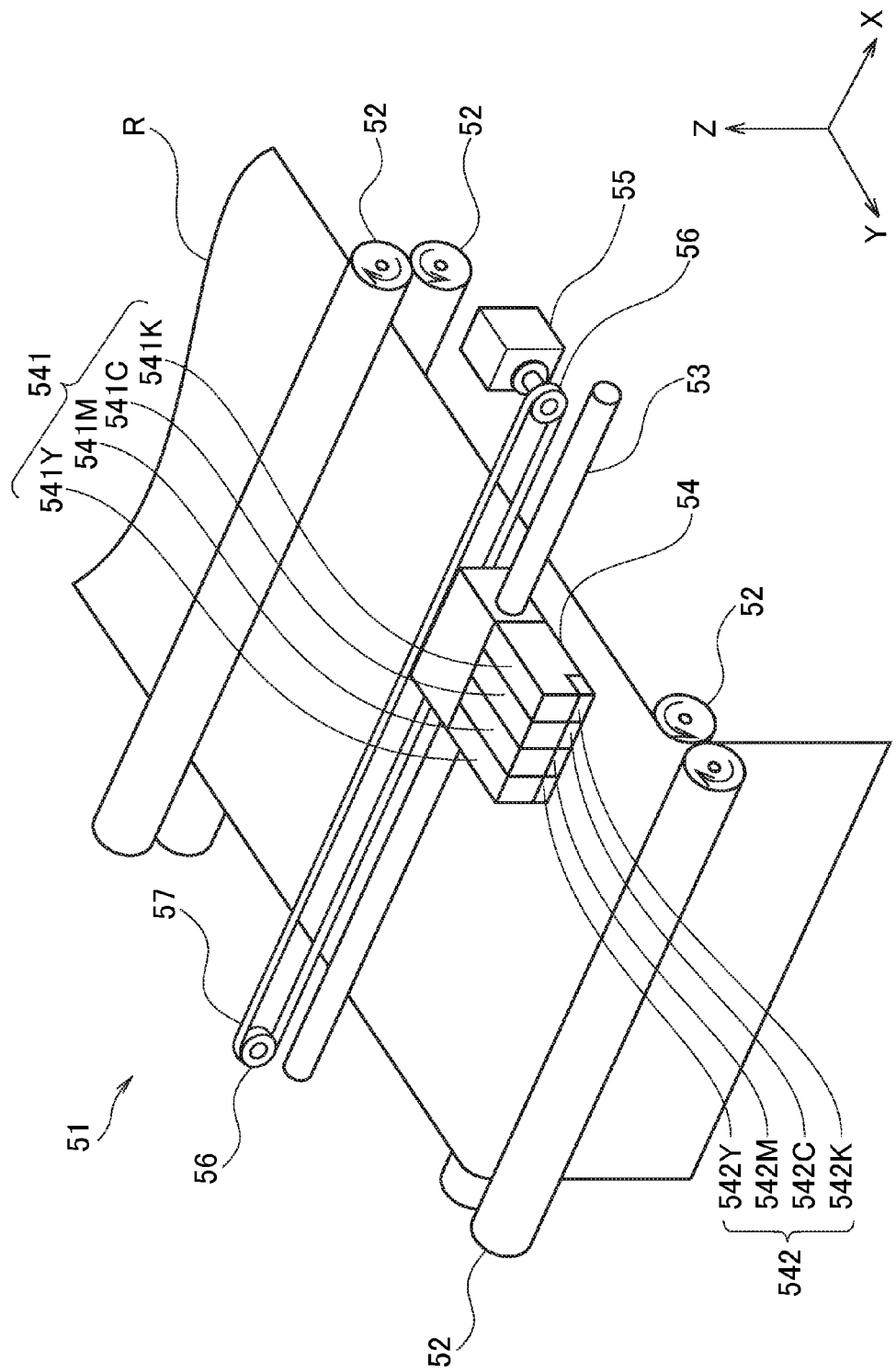
FIG. 16 is a perspective view of an image forming portion arranged inside of a housing of the image forming apparatus as an embodiment of the present invention.

The image forming apparatus 50 as an embodiment of the present invention will be described with reference to FIGS. 15 and 16. The image sensor unit 1 as an embodiment of the present invention is applied to the image forming apparatus 50 as an embodiment of the present invention. FIG. 15 is an external perspective view of the image forming apparatus 50 as an embodiment of the present invention. FIG. 16 is a perspective view illustrated by extracting an image forming portion 51 arranged inside of a housing of the image forming apparatus 50 as an embodiment of the present invention. As shown in FIGS. 15 and 16, the image forming apparatus 50 is a multifunction printer (MFP) of a flat-bed type scanner and an inkjet-type printer, and the image forming apparatus 50 includes: an image reading portion 59 as image reading means for reading an image; and the image forming portion 51 as image forming means for forming an image. The image sensor unit 1 as an embodiment of the present invention is incorporated into the image reading portion 59 of the image forming apparatus 50. The same components as those of the image reading apparatus 10 can be applied to the image reading portion 59 of the image forming apparatus 50. Therefore, the same components as those of the image reading apparatus 10 are designated with the same reference numerals, and the description will not be repeated.

As shown in FIG. 15, the image forming apparatus 50 includes an operation portion 501. The operation portion 501 includes: a display portion 502 that displays an operation menu, various messages, and the like; and various operation buttons 503 for operating the image forming apparatus 50.

As shown in FIG. 16, the image forming portion 51 is arranged inside of a housing 504 of the image forming apparatus 50. The image forming portion 51 includes conveyor rollers 52, a guide shaft 53, an inkjet cartridge 54, a motor 55, and a pair of timing pulleys 56. The conveyor rollers 52 are rotated by driving force of a driving source to convey printing paper R as a recording medium in the sub-scan direction. The guide shaft 53 is a rod-like member and is fixed to the housing of the image forming apparatus 50 so that the axis line is parallel to the main-scan direction of the printing paper R. The inkjet cartridge 54 can slide over the guide shaft 53 to move back and forth in the main-scan direction of the printing paper R. The inkjet cartridge 54 includes, for example: ink tanks 541 with cyan C, magenta M, yellow Y, and black K inks (541C, 541M, 541Y, and 541K); and discharge heads 542 (542C, 542M, 542Y, and 542K) arranged on the ink tanks 541. One of the pair of timing pulleys 56 is attached to the rotating shaft of the motor 55. The pair of timing pulleys 56 are arranged at positions away from each other in the main-scan direction of the printing paper R. A timing belt 57 is wound around the pair of timing pulleys 56 in parallel with the pair of timing pulleys 56, and a predetermined section is coupled to the inkjet cartridge 54.

The image reading portion 59 of the image forming apparatus 50 converts the image read by the image sensor unit 1 to an electric signal in a form suitable for printing. Based on the electric signal converted by the image sensor unit 1 of the image reading portion 59, the image forming portion 51 of the image forming apparatus 50 drives the conveyor rollers 52, the motor 55, and the inkjet cartridge 54 to form the image on the printing paper R. The image forming portion 51 of the image forming apparatus 50 can also form an image based on an electric signal input from the outside. The configuration and operation of the image forming portion 51 of the image forming apparatus 50 can be the same configurations as various well-known printers. Therefore, details will not be described.

The image sensor unit 1 as an embodiment of the present invention is applied to the image reading portion 59 in the image forming apparatus 50 according to an embodiment of the present invention. Therefore, the illumination distribution of the illumination light emitted to the original P can be made uniform.

Example

A verification result of the effect of the embodiment of the present invention will be described.

The dimensions of the diffusing patterns 331a and 331b of the light guides 3a and 3b of the illumination apparatuses 9a and 9b according to an example are different between the areas closer to the light incident surfaces 31 (areas A, C, and E) and the areas farther from the light incident surfaces 31 (areas B and D). The diffusing patterns 331a in the areas closer to the light incident surfaces 31 are formed in a convex shape with a substantially triangular cross section, wherein the height is 0.05 mm, and the width (main-scan direction dimension) is 0.10 mm. The intervals between the diffusing patterns 331a in the areas are 1.6 mm at the maximum.

Meanwhile, diffusing patterns of a light guide of an illumination apparatus according to a comparative example are the same throughout the entire light diffusing surface. The diffusing patterns of the light guide of the comparative example are formed in a convex shape with a substantially triangular cross section, wherein the height is 0.10 mm, and the width is 0.20 mm. The intervals between the diffusing patterns of the light guide of the comparative example are 3.2 mm at the maximum.

In both of the example and the comparative example, a white reference plate arranged in a position (hereinafter, "reference position") at a predetermined distance from the light guide in the Z direction is used in advance to perform correction to make the output of the image sensor uniform throughout the whole length in the main-scan direction. The white reference plate is arranged in a position 0.5 mm closer to the light guide from the reference position to measure the level of output of the image sensor.

Figure 17A:
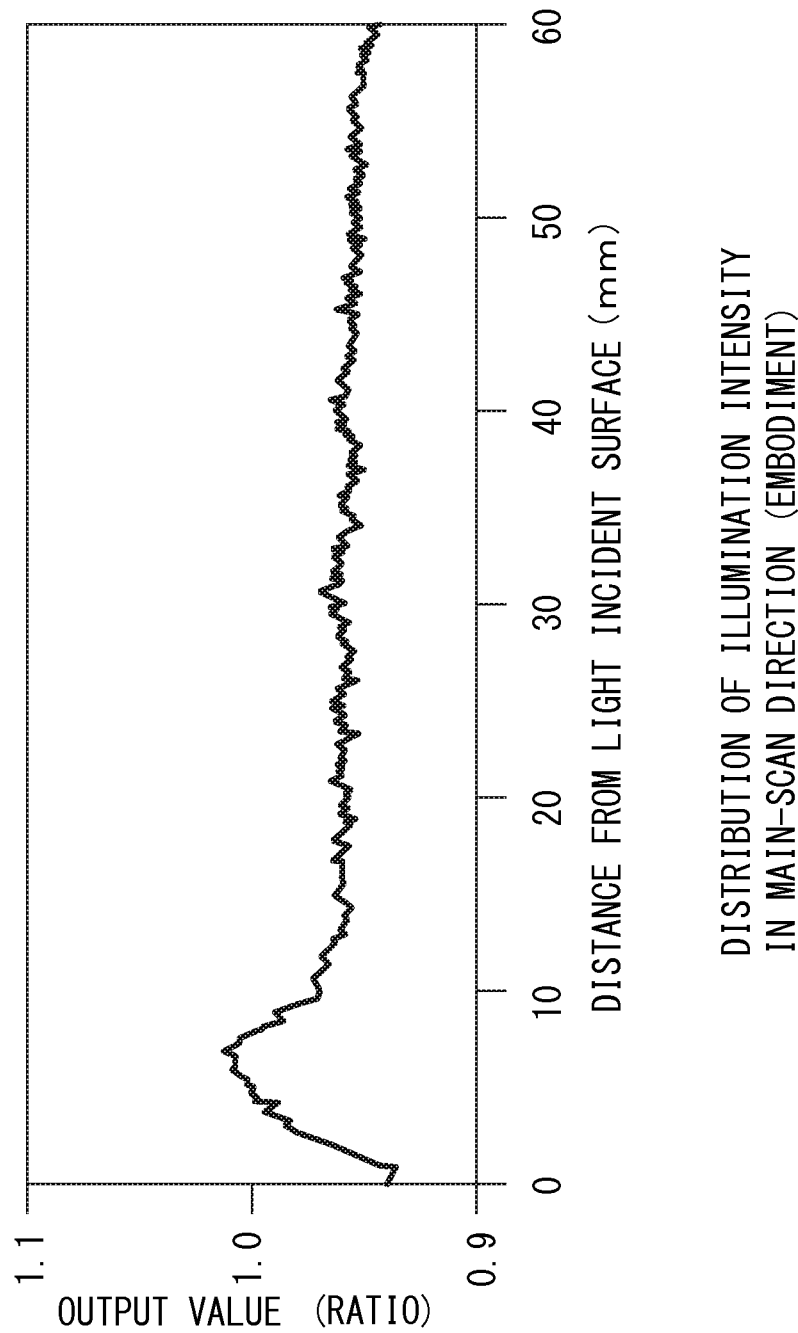
FIG. 17A is a graph showing a measurement result of a distribution of illumination intensity near a light incident surface in the illumination apparatus according to an example.
Figure 18A:
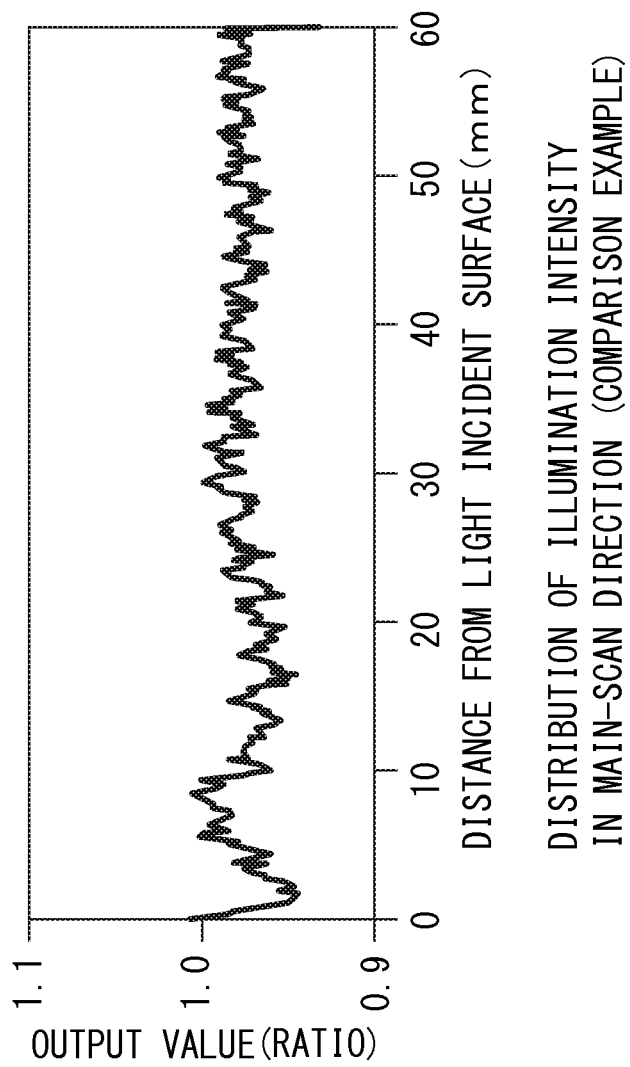
FIG. 18A is a graph showing a measurement result of a distribution of illumination intensity near a light incident surface in an illumination apparatus according to a comparative example.
Figure 18B:
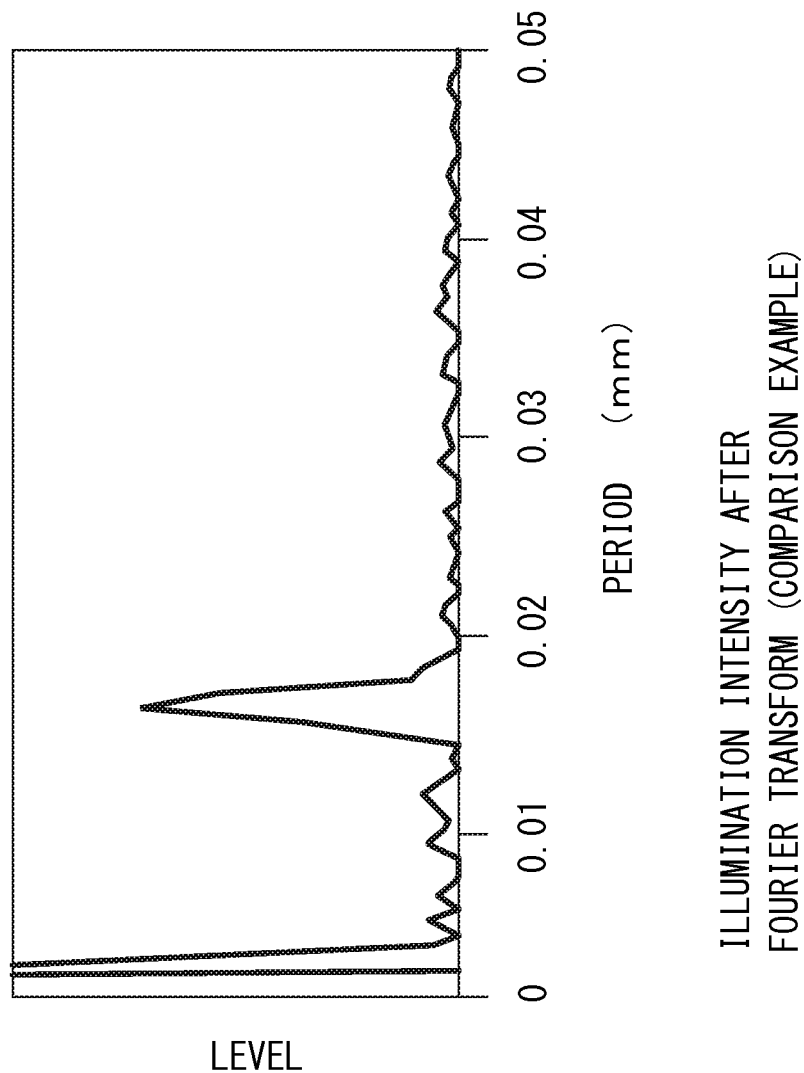
FIG. 18B is a graph showing a result of Fourier transform of the illumination intensity in the illumination apparatus according to the comparative example.

FIGS. 17A, 17B, 18A, and 18B are graphs showing output of the image sensor measured as described above. FIGS. 17A and 17B illustrate the example, and FIGS. 18A and 18B illustrate the comparative example. FIGS. 17A and 18A are graphs illustrated by extracting the illumination intensity immediately next to the light incident surface (part where the interval between the diffusing patterns is the largest). The vertical axis of the graphs of FIGS. 17A and 18A denotes a ratio dividing the output value of the image sensor by the output after the correction at the reference position. FIGS. 17B and 18B are graphs showing results of Fourier transform of the illumination intensity shown in FIGS. 17A and 18A, respectively.

In the comparative example, the illumination intensity periodically changes as shown in FIG. 18A. As shown in FIG. 18B, the illumination intensity after the Fourier transform has a large peak in a period of about 3.0 mm. The period is equivalent to the interval between the diffusing patterns. Therefore, it can be stated that the illumination intensity in the comparative example periodically changes due to the diffusing patterns.

On the other hand, the change of the illumination intensity in the main-scan direction in the example is smaller than that of the comparative example as shown in FIG. 17A. As shown in FIG. 17B, there is no peak in a period of 1.6 mm that is a period of the diffusing patterns. Therefore, it can be stated that there is no nonuniformity of the illumination intensity caused by the diffusing patterns in the example.

As described, it is confirmed that the nonuniformity of the illumination intensity caused by the diffusing patterns can be prevented according to the present example. Particularly, it is confirmed that the occurrence of nonuniformity of the illumination intensity caused by the diffusing patterns can be prevented even when the light guide and the original P approach each other.

Although the embodiments and the example of the present invention have been described in detail, the embodiments and the example are just specific examples for carrying out the present invention. The technical scope of the present invention is not limited to the embodiments and the example. Various changes can be made in the present invention without departing from the scope of the present invention.

For example, the image reading apparatus according to the present invention is not limited to the image scanner with the configuration described in the embodiments. The image forming apparatus is not limited to the inkjet type, and any type, such as an electrophotographic type, a thermal transfer type, and a dot impact type, is possible. The image forming apparatus is not limited to the multifunction printer described in the embodiments. A copying machine and a facsimile, to which the image sensor unit according to the present invention is applied, are also included in the image reading apparatus of the present invention.

Although the illumination apparatus including the light source and the light guide is used as a reflection reading light source for the original P, the illumination apparatus may be used as a transmission light source.

The present invention can be effectively used for an image sensor unit and for an image reading apparatus or an image forming apparatus (for example, an image scanner, a facsimile, a copying machine, or a multifunction printer) to which the image sensor unit is applied. According to the present invention, the intervals between the patterns for diffusing light can be reduced, and the nonuniformity of the illumination intensity caused by the patterns can be prevented or suppressed.

What is claimed is:
1. An illumination apparatus comprising:
   a light source; and
   a light guide formed in a rod shape, wherein a first end surface in a longitudinal direction is a first incident surface that receives light emitted from the light source,
   wherein a plurality of patterns for diffusing light are formed on a first area of the light guide and a second area of the light guide, the first area closer to the first incident surface than the second area,
   wherein intervals between at least some of the patterns formed in a first region of the first area closest to the first incident surface are smaller than intervals between at least some of the patterns formed in a first region of the second area closest to the first incident surface, and
   wherein a dimension of the patterns formed in the first area is smaller than a dimension of the patterns formed in the second area.
2. The illumination apparatus according to claim 1, wherein the intervals between the patterns in each of the first area and the second area decrease with an increase in distance from the first incident surface.

3. The illumination apparatus according to claim 1, wherein:
- a second end surface of the light guide in the longitudinal direction is a second incident surface, and
- a dimension of the patterns formed in two respective opposing end areas closest to a respective one of the first incident surface and the second incident surface of the light guide in the longitudinal direction is smaller than a dimension of the patterns formed in a middle area positioned between the two respective opposing end areas.

4. The illumination apparatus according to claim 1, wherein only the first incident surface exists as an end surface of the light guide in the longitudinal direction that is an incident surface.

5. The illumination apparatus according to claim 1, wherein
- the patterns are prism structures that emit light to outside, and
- the illumination apparatus further comprises a member with a light reflection surface that reflects the light emitted from the patterns to cause the light to enter the light guide.

6. An image sensor unit comprising:
- an illumination apparatus;
- a light condenser that condenses reflected light reflected by an illuminated object after emission from the illumination apparatus;
- an image sensor that converts the reflected light condensed by the light condenser to an electric signal; and
- a circuit board provided with the image sensor,
- wherein the illumination apparatus comprises a light source and a light guide formed in a rod shape,
- wherein a first end surface in a longitudinal direction is a first incident surface that receives light emitted from the light source,
- wherein a plurality of patterns for diffusing light are formed on a first area of the light guide and a second area of the light guide, the first area closer to the first incident surface than the second area,
- wherein intervals between at least some of the patterns formed in a first region of the first area closest to the first incident surface are smaller than intervals between at least some of the patterns formed in a first region of the second area closest to the first incident surface, and
- wherein a dimension of the patterns formed in the first area is smaller than a dimension of the patterns formed in the second area.

7. An illumination apparatus comprising:
- a light source;
- a light guide formed in a rod shape, wherein a first end surface in a longitudinal direction is a first incident surface that receives light emitted from the light source,
- wherein a plurality of patterns for diffusing light and a light emission surface that emits light are formed on the light guide,
- wherein the patterns are prism structures that emit light to outside,
- wherein the patterns are formed on a first area of the light guide and a second area of the light guide, the first area closer to the first incident surface than the second area,
- wherein the illumination apparatus further comprises a member with a light reflection surface that reflects the light emitted from the patterns to cause the light to enter the light guide,
- wherein intervals between at least some of the patterns formed in a first region of the first area closest to the first incident surface are smaller than intervals between at least some of the patterns formed in a first region of the second area closest to the first incident surface,
- wherein the intervals between the patterns in each of the first area and the second area decrease with an increase in distance from the first incident surface, and
- wherein a dimension of the patterns formed in the first area is smaller than a dimension of the patterns formed in the second area.

* * * * *